US012684361B2

(12) United States Patent
Alriksson et al.

(10) Patent No.: US 12,684,361 B2
(45) Date of Patent: Jul. 14, 2026

(54) MASTER INFORMATION BLOCK (MIB) TYPE DETERMINATION

(71) Applicant: Telefonaktiebolaget LM Ericsson (publ), Stockholm (SE)

(72) Inventors: Peter Alriksson, Hörby (SE); Havish Koorapaty, Saratoga, CA (US); Stephen Grant, Pleasanton, CA (US); Jung-Fu Cheng, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 495 days.

(21) Appl. No.: 17/792,804

(22) PCT Filed: Jan. 18, 2021

(86) PCT No.: PCT/EP2021/050960
§ 371 (c)(1),
(2) Date: Jul. 14, 2022

(87) PCT Pub. No.: WO2021/148356
PCT Pub. Date: Jul. 29, 2021

(65) Prior Publication Data
US 2023/0057016 A1     Feb. 23, 2023

Related U.S. Application Data

(60) Provisional application No. 62/964,268, filed on Jan. 22, 2020.

(51) Int. Cl.
*H04W 16/14* (2009.01)
(52) U.S. Cl.
CPC ................................. *H04W 16/14* (2013.01)

(58) Field of Classification Search
CPC ..................................................... H04W 16/14
See application file for complete search history.

(56) References Cited

U.S. PATENT DOCUMENTS 10,492,157 B2     11/2019   Nam et al.
10,548,055 B2     1/2020    Wiemann et al.
(Continued)

FOREIGN PATENT DOCUMENTS

WO       WO-2017100355 A1 *   6/2017    ............. H04L 5/001

OTHER PUBLICATIONS

3GPP TS 38.211 V15.8.0 (Dec. 2019) (Year: 2019).*
(Continued)

*Primary Examiner* — Charles C Jiang
*Assistant Examiner* — Margaret Marie Anderson
(74) *Attorney, Agent, or Firm* — Sage Patent Group

(57) ABSTRACT

Embodiments include methods, performed by a user equipment (UE), for receiving system information (SI) associated with a cell in a wireless network. Such methods include receiving, from the wireless network, a master information block (MIB) including SI associated with the cell. The MIB can be applicable to both a first frequency band and a second frequency band that have a common frequency range. Such methods also include determining whether the MIB applies to the first frequency band or the second frequency band. Other embodiments include complementary methods performed by a network node serving the cell in the wireless network, as well as UEs and network nodes configured to perform operations corresponding to such methods.

20 Claims, 12 Drawing Sheets

(56) References Cited

U.S. PATENT DOCUMENTS

| | | | | |
|---|---|---|---|---|
| 2012/0327895 | A1 | 12/2012 | Wallen et al. | |
| 2013/0195073 | A1 | 8/2013 | Chen et al. | |
| 2015/0003348 | A1 | 1/2015 | Ishii et al. | |
| 2017/0099126 | A1 | 4/2017 | Yoo et al. | |
| 2019/0306832 | A1* | 10/2019 | Si | H04L 5/0082 |
| 2020/0045658 | A1* | 2/2020 | Nam | H04W 56/001 |
| 2022/0086914 | A1* | 3/2022 | Lee | H04L 1/00 |
| 2022/0191810 | A1* | 6/2022 | Tang | H04L 27/2607 |
| 2022/0312303 | A1* | 9/2022 | He | H04W 16/14 |

OTHER PUBLICATIONS

"3GPP TS 23.501 V15.8.0", 3rd Generation Partnership Project; Technical Specification Group Services and System Aspects; System architecture for the 5G System (5GS); Stage 2 (Release 15), Dec. 2019, pp. 1-248.

"3GPP TS 38.101-1 V15.7.0", 3rd Generation Partnership Project; Technical Specification Group Radio Access Network; NR; User Equipment (UE) radio transmission and reception; Part 1: Range 1 Standalone (Release 15), Sep. 2019, pp. 1-234.

"3GPP TS 38.214 V15.0.0", 3rd Generation Partnership Project; Technical Specification Group Radio Access Network; NR; Physical layer procedures for data (Release 15), Dec. 2017, pp. 1-71.

"3GPP TS 38.401 V15.7.0", 3rd Generation Partnership Project; Technical Specification Group Radio Access Network; NG-RAN; Architecture description (Release 15), Dec. 2019, pp. 1-47.

"3GPP TS 38.213 V15.6.0", 3rd Generation Partnership Project; Technical Specification Group Radio Access Network; NR; Physical layer procedures for control (Release 15), Jun. 2019, pp. 1-107.

"Initial Access Signals and Channels", 3GPP TSG-RAN WG1 Meeting #100bis-e, Tdoc R1-2002028, e-Meeting, Apr. 20-Apr. 30, 2020, pp. 1-3.

"Initial Access Signals and Channels", 3GPP TSG-RAN WG1 Meeting #101-e, Tdoc R1-2003839, May 25-Jun. 3, 2020, pp. 1-2.

"Signaling of Q for NR-U", 3GPP TSG-RAN WG2 #109-e, R2-2000338, Electronic meeting, Feb. 24-Mar. 6, 2020, pp. 1-11.

"3GPP TS 36.331 V11.5.0", 3rd Generation Partnership Project; Technical Specification Group Radio Access Network; Evolved Universal Terrestrial Radio Access (E-UTRA); Radio Resource Control (RRC); Protocol specification (Release 11), Sep. 2013, pp. 1-347.

"3GPP TS 38.331 V15.8.", 3rd Generation Partnership Project; Technical Specification Group Radio Access Network; NR; Radio Resource Control (RRC) protocol specification (Release 15), Dec. 2019, pp. 1-532.

"3GPP TR 38.801 V2.0.0", 3rd Generation Partnership Project; Technical Specification Group Radio Access Network; Study on New Radio Access Technology; Radio Access Architecture and Interfaces (Release 14), Mar. 2017, pp. 1-90.

"3GPP TS 38.211 V15.7.0", 3rd Generation Partnership Project; Technical Specification Group Radio Access Network; NR; Physical channels and modulation (Release 15), Sep. 2019, pp. 1-97.

"Enhanced DRS Design for LAA", MediaTek Inc., 3GPP TSG RAN WG1 Meeting #82b, R1-156057, Malmo, Sweden, Oct. 5-9, 2015, pp. 1-7.

"LTE-U Forum", Alcatel-Lucent et al., LTE-U CSAT Procedure T5 V1.0, Oct. 2015, pp. 1-7.

* cited by examiner

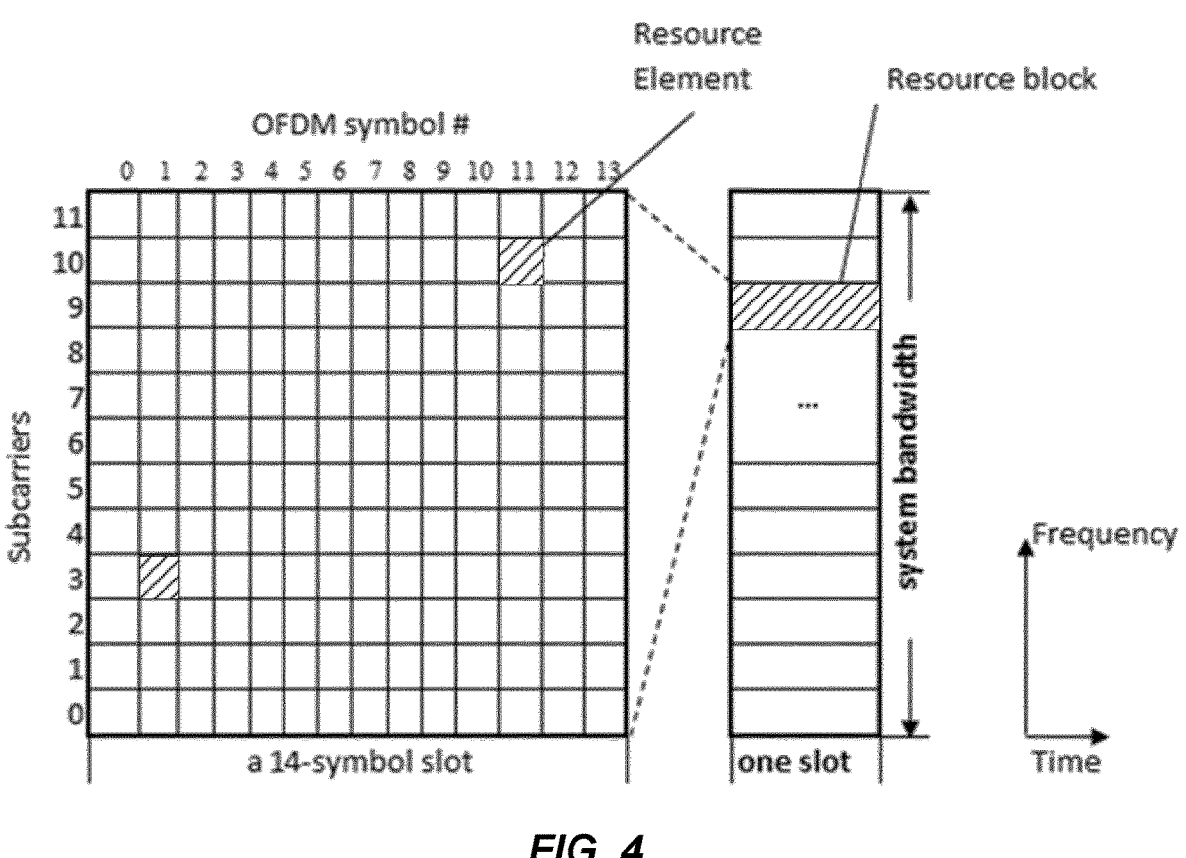
FIG. 4
FIG. 5A
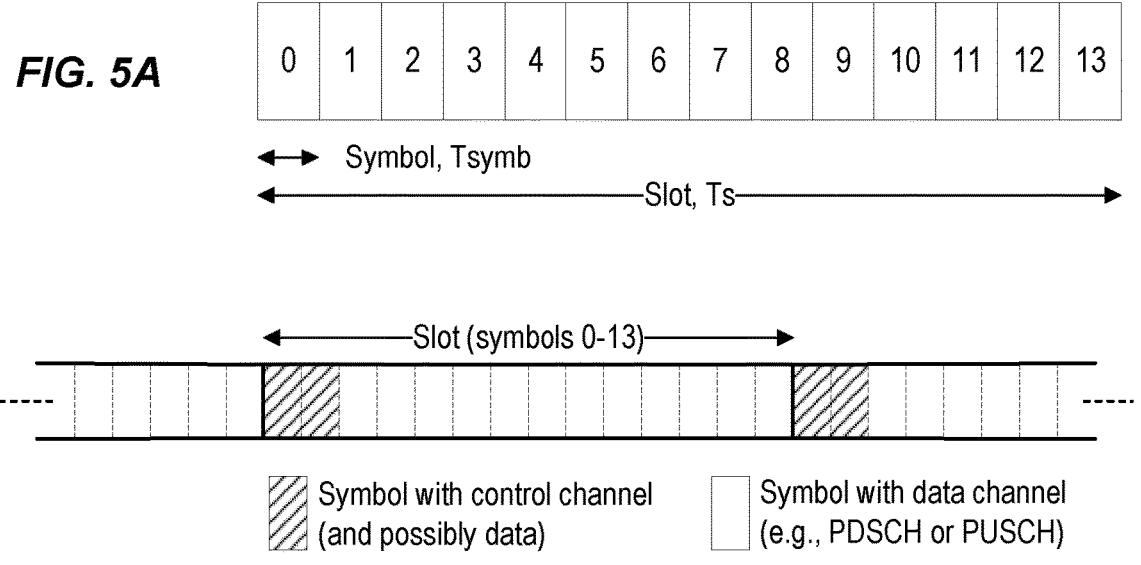
FIG. 5B

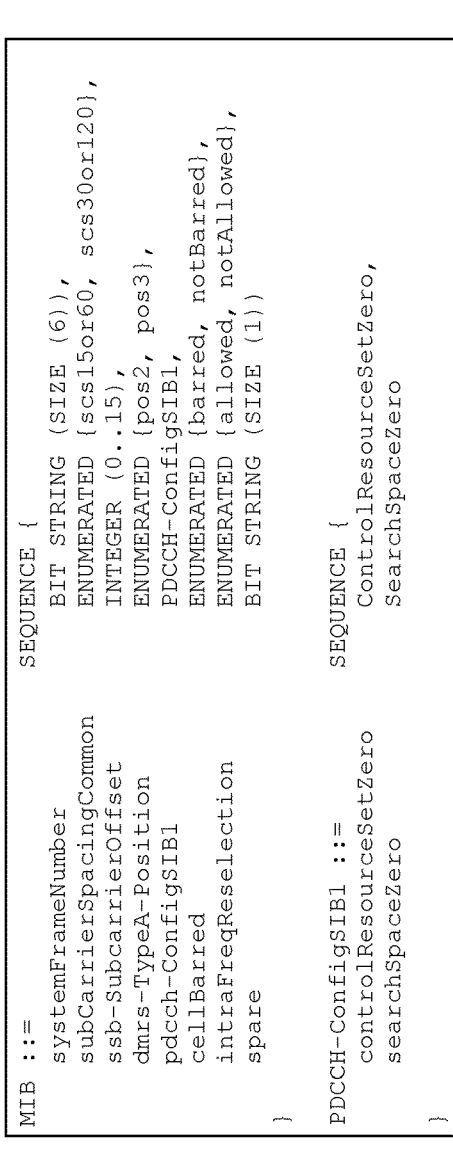

```
MIB ::=                     SEQUENCE {
  systemFrameNumber           BIT STRING (SIZE (6)),
  subCarrierSpacingCommon     ENUMERATED {scs15or60, scs30or120},
  ssb-SubcarrierOffset        INTEGER (0..15),
  dmrs-TypeA-Position         ENUMERATED {pos2, pos3},
  pdcch-ConfigSIB1            PDCCH-ConfigSIB1,
  cellBarred                  ENUMERATED {barred, notBarred},
  intraFreqReselection        ENUMERATED {allowed, notAllowed},
  spare                       BIT STRING (SIZE (1))
}

PDCCH-ConfigSIB1 ::=        SEQUENCE {
  controlResourceSetZero      ControlResourceSetZero,
  searchSpaceZero             SearchSpaceZero
}
```

FIG. 6

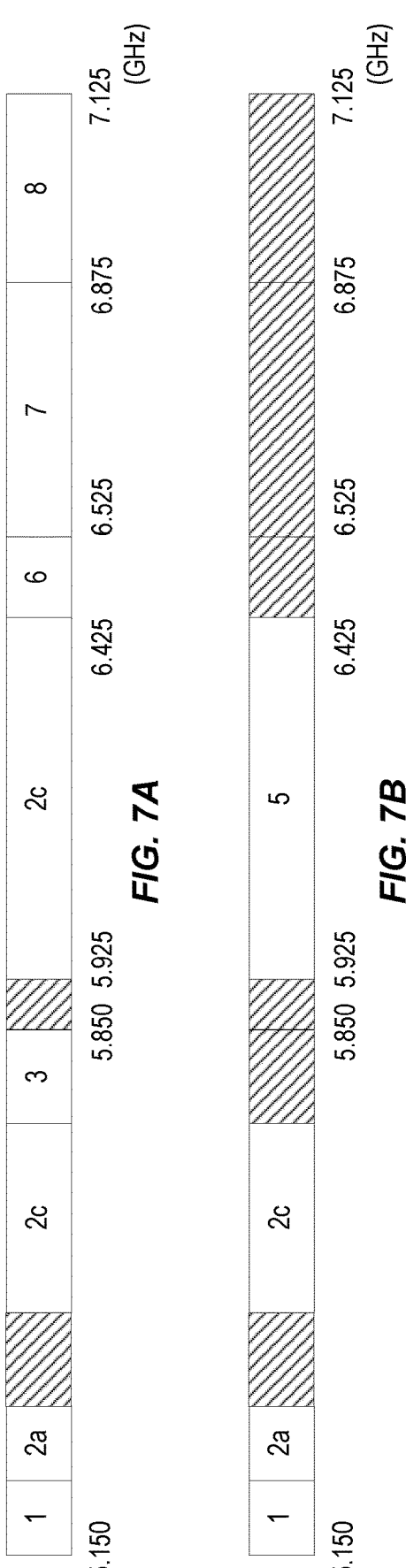

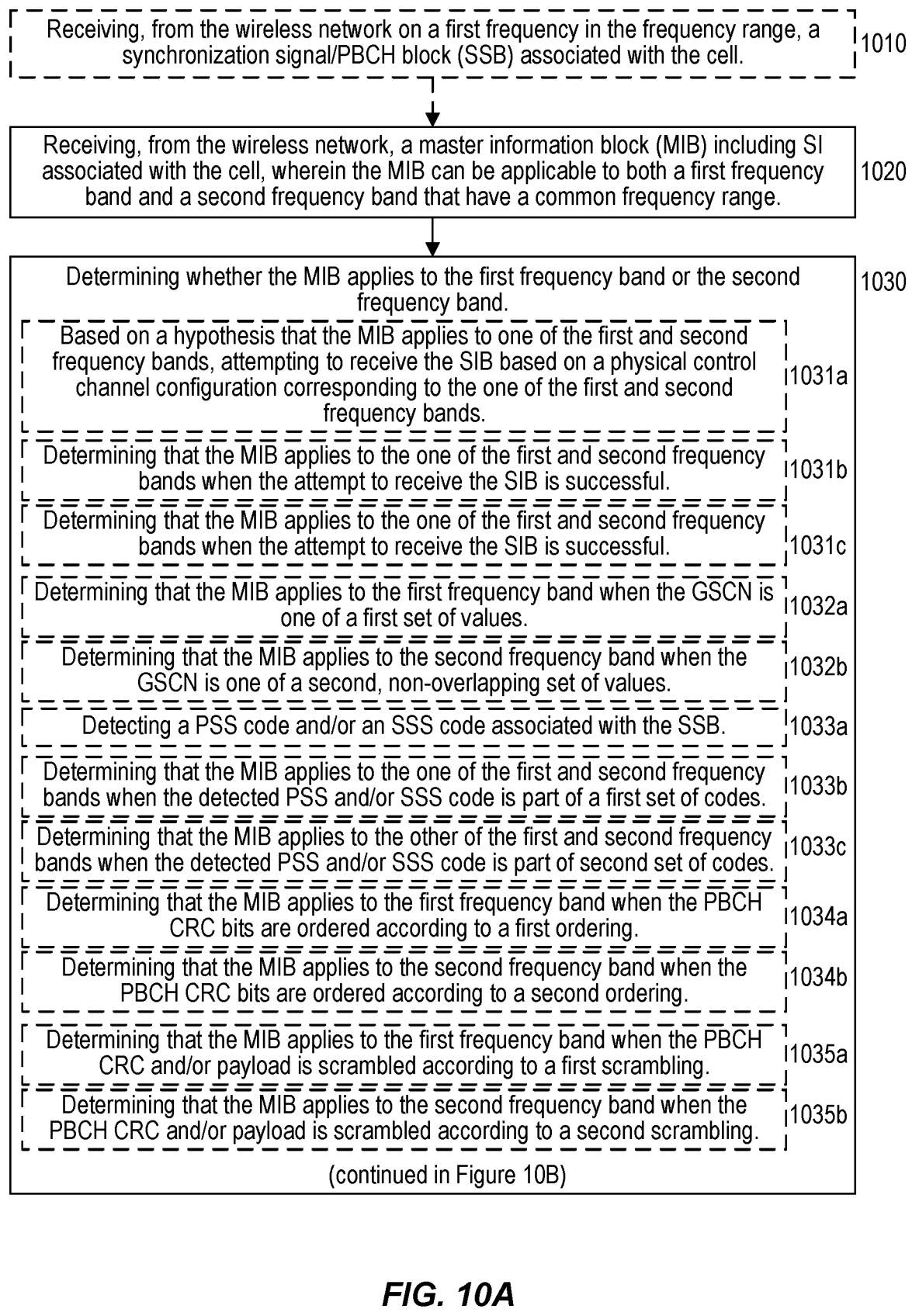

Receiving, from the wireless network on a first frequency in the frequency range, a synchronization signal/PBCH block (SSB) associated with the cell. 1010

Receiving, from the wireless network, a master information block (MIB) including SI associated with the cell, wherein the MIB can be applicable to both a first frequency band and a second frequency band that have a common frequency range. 1020

Determining whether the MIB applies to the first frequency band or the second frequency band. 1030

Based on a hypothesis that the MIB applies to one of the first and second frequency bands, attempting to receive the SIB based on a physical control channel configuration corresponding to the one of the first and second frequency bands. 1031a Determining that the MIB applies to the one of the first and second frequency bands when the attempt to receive the SIB is successful. 1031b Determining that the MIB applies to the one of the first and second frequency bands when the attempt to receive the SIB is successful. 1031c Determining that the MIB applies to the first frequency band when the GSCN is one of a first set of values. 1032a Determining that the MIB applies to the second frequency band when the GSCN is one of a second, non-overlapping set of values. 1032b Detecting a PSS code and/or an SSS code associated with the SSB. 1033a Determining that the MIB applies to the one of the first and second frequency bands when the detected PSS and/or SSS code is part of a first set of codes. 1033b Determining that the MIB applies to the other of the first and second frequency bands when the detected PSS and/or SSS code is part of second set of codes. 1033c Determining that the MIB applies to the first frequency band when the PBCH CRC bits are ordered according to a first ordering. 1034a Determining that the MIB applies to the second frequency band when the PBCH CRC bits are ordered according to a second ordering. 1034b Determining that the MIB applies to the first frequency band when the PBCH CRC and/or payload is scrambled according to a first scrambling. 1035a Determining that the MIB applies to the second frequency band when the PBCH CRC and/or payload is scrambled according to a second scrambling. 1035b (continued in Figure 10B)

FIG. 10A

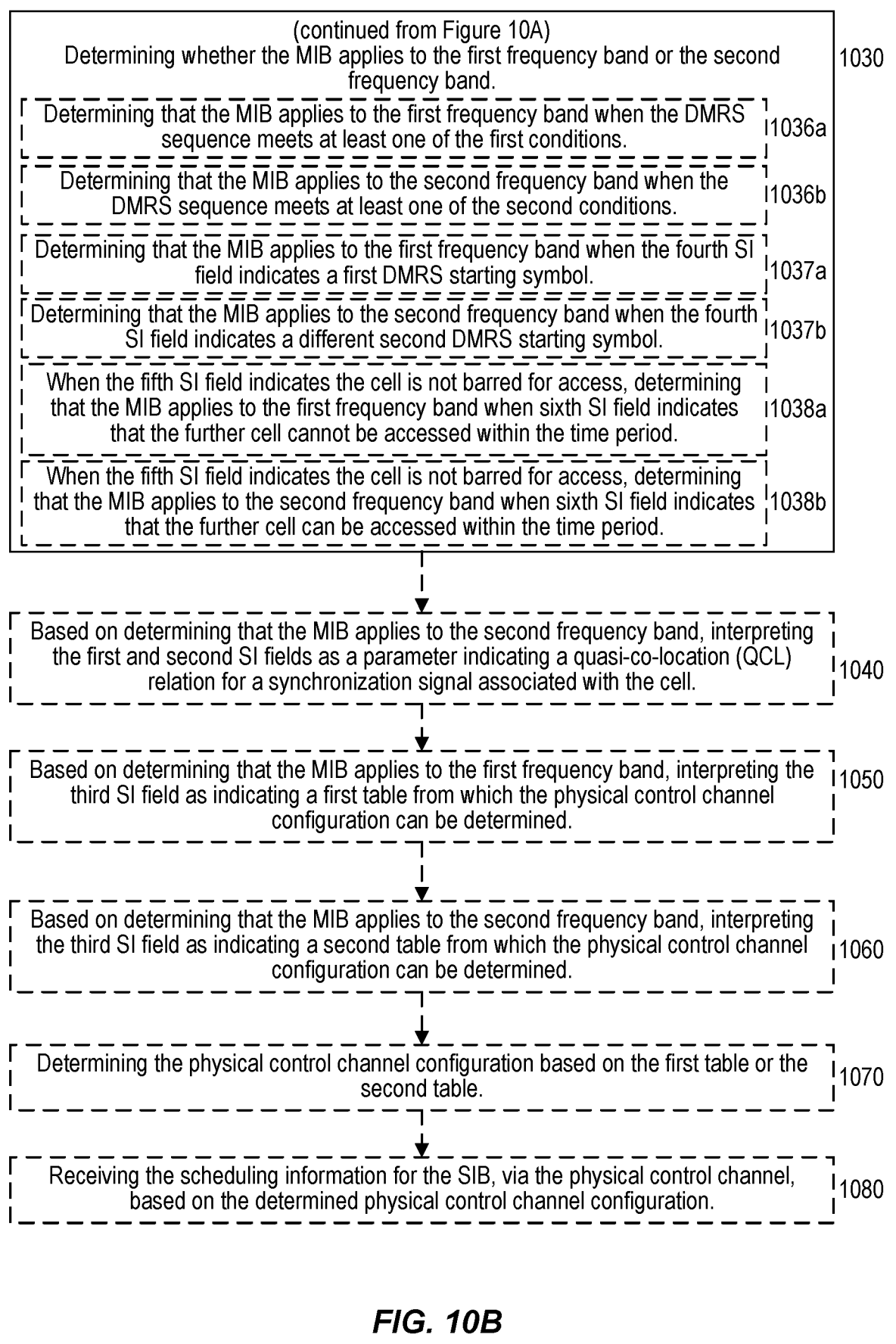

(continued from Figure 10A)
Determining whether the MIB applies to the first frequency band or the second frequency band. — 1030

Determining that the MIB applies to the first frequency band when the DMRS sequence meets at least one of the first conditions. — 1036a Determining that the MIB applies to the second frequency band when the DMRS sequence meets at least one of the second conditions. — 1036b Determining that the MIB applies to the first frequency band when the fourth SI field indicates a first DMRS starting symbol. — 1037a Determining that the MIB applies to the second frequency band when the fourth SI field indicates a different second DMRS starting symbol. — 1037b When the fifth SI field indicates the cell is not barred for access, determining that the MIB applies to the first frequency band when sixth SI field indicates that the further cell cannot be accessed within the time period. — 1038a When the fifth SI field indicates the cell is not barred for access, determining that the MIB applies to the second frequency band when sixth SI field indicates that the further cell can be accessed within the time period. — 1038b Based on determining that the MIB applies to the second frequency band, interpreting the first and second SI fields as a parameter indicating a quasi-co-location (QCL) relation for a synchronization signal associated with the cell. — 1040

Based on determining that the MIB applies to the first frequency band, interpreting the third SI field as indicating a first table from which the physical control channel configuration can be determined. — 1050

Based on determining that the MIB applies to the second frequency band, interpreting the third SI field as indicating a second table from which the physical control channel configuration can be determined. — 1060

Determining the physical control channel configuration based on the first table or the second table. — 1070

Receiving the scheduling information for the SIB, via the physical control channel, based on the determined physical control channel configuration. — 1080

*FIG. 10B*

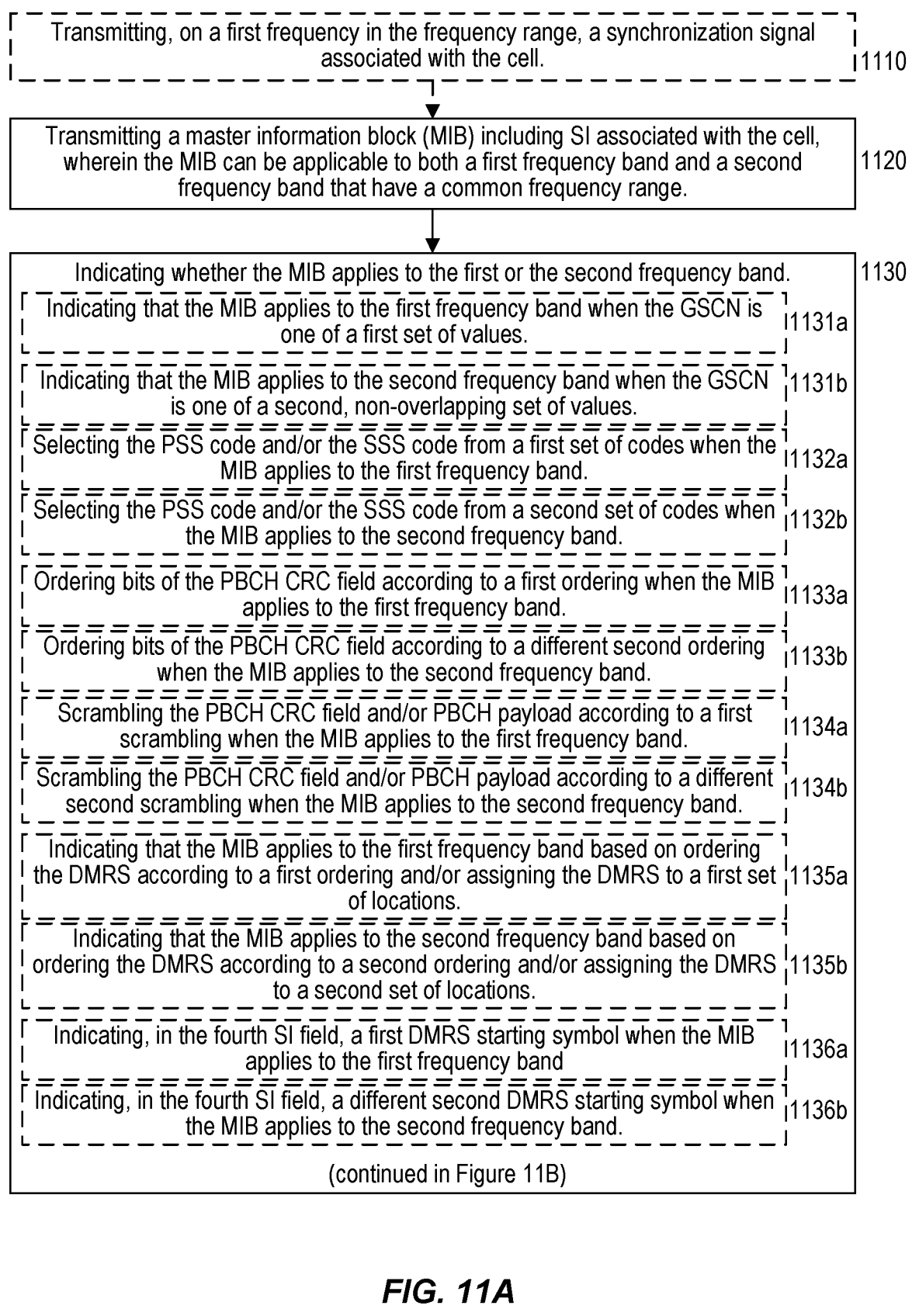

Transmitting, on a first frequency in the frequency range, a synchronization signal associated with the cell. | 1110

Transmitting a master information block (MIB) including SI associated with the cell, wherein the MIB can be applicable to both a first frequency band and a second frequency band that have a common frequency range. | 1120

Indicating whether the MIB applies to the first or the second frequency band. | 1130

Indicating that the MIB applies to the first frequency band when the GSCN is one of a first set of values. | 1131a Indicating that the MIB applies to the second frequency band when the GSCN is one of a second, non-overlapping set of values. | 1131b Selecting the PSS code and/or the SSS code from a first set of codes when the MIB applies to the first frequency band. | 1132a Selecting the PSS code and/or the SSS code from a second set of codes when the MIB applies to the second frequency band. | 1132b Ordering bits of the PBCH CRC field according to a first ordering when the MIB applies to the first frequency band. | 1133a Ordering bits of the PBCH CRC field according to a different second ordering when the MIB applies to the second frequency band. | 1133b Scrambling the PBCH CRC field and/or PBCH payload according to a first scrambling when the MIB applies to the first frequency band. | 1134a Scrambling the PBCH CRC field and/or PBCH payload according to a different second scrambling when the MIB applies to the second frequency band. | 1134b Indicating that the MIB applies to the first frequency band based on ordering the DMRS according to a first ordering and/or assigning the DMRS to a first set of locations. | 1135a Indicating that the MIB applies to the second frequency band based on ordering the DMRS according to a second ordering and/or assigning the DMRS to a second set of locations. | 1135b Indicating, in the fourth SI field, a first DMRS starting symbol when the MIB applies to the first frequency band | 1136a Indicating, in the fourth SI field, a different second DMRS starting symbol when the MIB applies to the second frequency band. | 1136b (continued in Figure 11B)

FIG. 11A

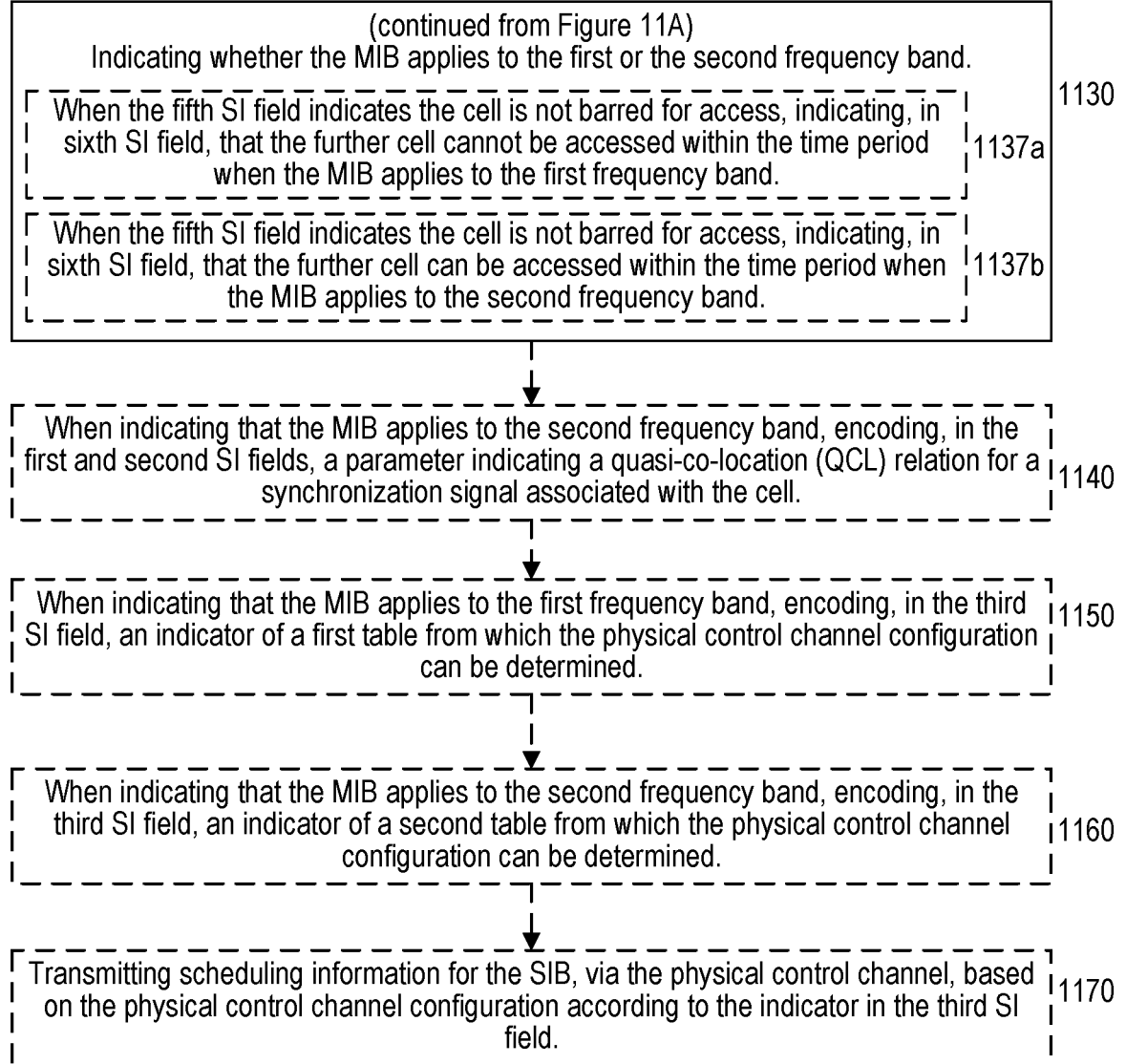

(continued from Figure 11A)
Indicating whether the MIB applies to the first or the second frequency band.

When the fifth SI field indicates the cell is not barred for access, indicating, in sixth SI field, that the further cell cannot be accessed within the time period when the MIB applies to the first frequency band. 1137a When the fifth SI field indicates the cell is not barred for access, indicating, in sixth SI field, that the further cell can be accessed within the time period when the MIB applies to the second frequency band. 1137b

1130

When indicating that the MIB applies to the second frequency band, encoding, in the first and second SI fields, a parameter indicating a quasi-co-location (QCL) relation for a synchronization signal associated with the cell. 1140

When indicating that the MIB applies to the first frequency band, encoding, in the third SI field, an indicator of a first table from which the physical control channel configuration can be determined. 1150

When indicating that the MIB applies to the second frequency band, encoding, in the third SI field, an indicator of a second table from which the physical control channel configuration can be determined. 1160

Transmitting scheduling information for the SIB, via the physical control channel, based on the physical control channel configuration according to the indicator in the third SI field. 1170

*FIG. 11B*

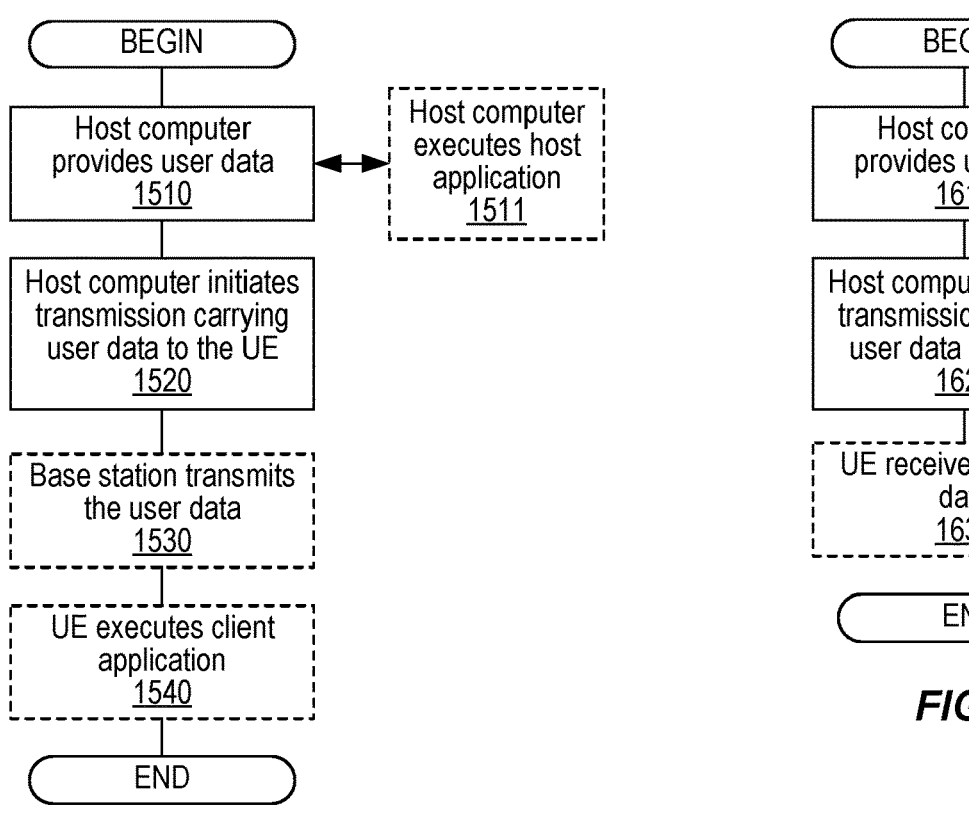
FIG. 15
FIG. 16
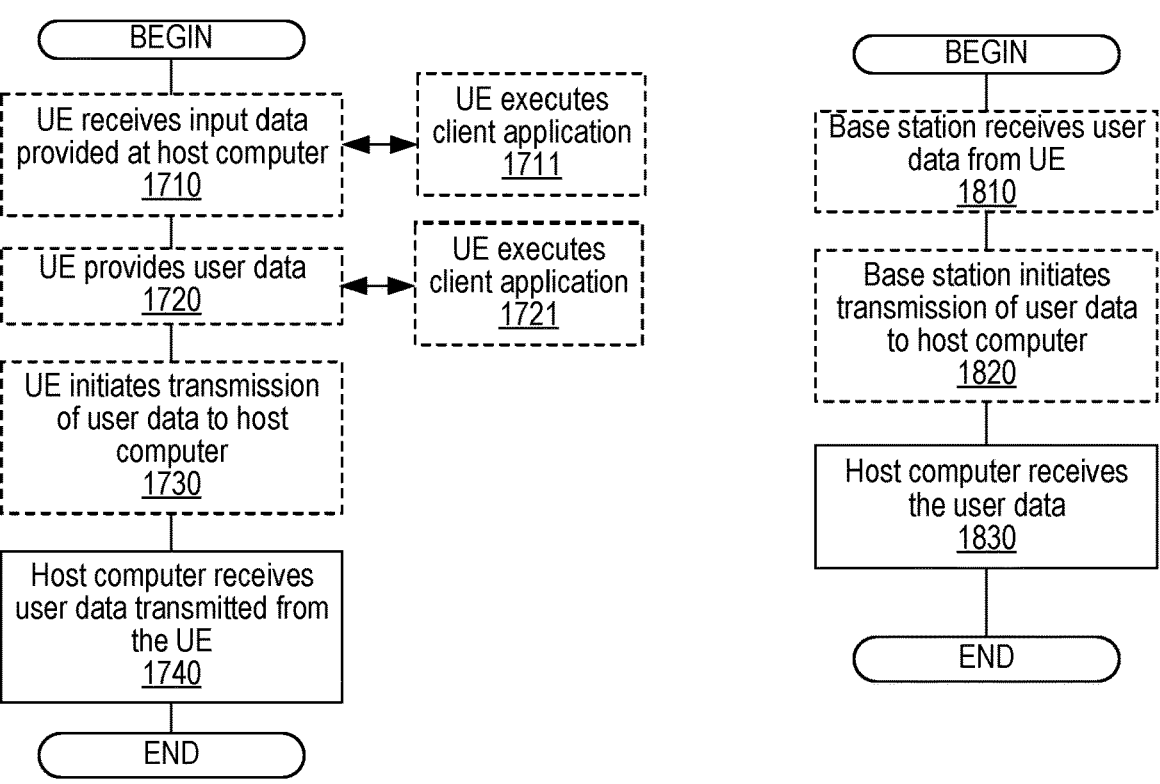
FIG. 17
FIG. 18

MASTER INFORMATION BLOCK (MIB) TYPE DETERMINATION

TECHNICAL FIELD

The present invention generally relates to wireless communication networks, and particularly relates to improvements that facilitate wireless devices to operate in a frequency range that can include overlapping licensed and unlicensed (or shared) frequency bands.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases. The present disclosure relates generally to NR, but the following description of Long Term Evolution (LTE) technology is provided for context since it shares many features with NR.

LTE is an umbrella term for fourth generation (4G) radio access technologies (RATs) developed within 3GPP and initially standardized in Releases 8 and 9, also known as Evolved UTRAN (E-UTRAN). LTE is available in various frequency bands and is accompanied by improvements to non-radio aspects referred to as System Architecture Evolution (SAE), including the Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink (UL) and downlink (DL), as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

FIG. 2 illustrates a block diagram of an exemplary control plane (CP) protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer provides resources for transferring data over transport channels via the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDLE state is known in the EPC and has an assigned IP address.

Furthermore, in RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state.

The multiple access scheme for the LTE PHY is based on Orthogonal Frequency Division Multiplexing (OFDM) with a cyclic prefix (CP) in the DL, and on Single-Carrier Frequency Division Multiple Access (SC-FDMA) with a cyclic prefix in the UL. To support transmission in paired and unpaired spectrum, the LTE PHY supports both Frequency Division Duplexing (FDD) (including both full- and half-duplex operation) and Time Division Duplexing (TDD). The FDD DL radio frame has a fixed duration of 10 ms and consists of 20 slots, labeled 0 through 19, each with a fixed duration of 0.5 ms. A 1-ms subframe includes two consecutive slots, each of which includes $N^{DL}_{symb}$ OFDM symbols comprised of $N_{sc}$ OFDM subcarriers. Exemplary values of $N^{DL}_{symb}$ can be 7 (with normal CP) or 6 (with extended-length CP) for subcarrier spacing (SCS) of 15 kHz. Ns, is configurable based upon available channel bandwidth.

A particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot, where $N^{RB}_{sc}$ is 12 for 15-kHz SCS.

An exemplary LTE FDD uplink (UL) radio frame can be arranged in a manner similar to the exemplary FDD DL radio frame described above. For example, each UL slot includes $N^{UL}_{symb}$ OFDM symbols, each of which includes $N_{sc}$ OFDM subcarriers.

In general, a physical channel corresponds a set of resource elements carrying information that originates from higher layers. Downlink (DL, i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH).

PDSCH is the main physical channel used for unicast downlink data transmission, but also for transmission of RAR (random access response), certain system information blocks, and paging information. PBCH carries the basic system information (SI) required by the UE to access the network. PDCCH is used for transmitting downlink control information (DCI) that carries scheduling information for DL messages on PDSCH and grants for UL transmission on PUSCH, among other information.

Uplink (UL, i.e., UE to eNB) physical channels provided by the LTE PHY include Physical Uplink Shared Channel (PUSCH), Physical Uplink Control Channel (PUCCH), and Physical Random Access Channel (PRACH). PUSCH is the uplink counterpart to the PDSCH. PUCCH is used by UEs to transmit uplink control information, including HARQ acknowledgements, channel state information reports, etc. PRACH is used for random access preamble transmission.

NR shares many similarities with LTE. For example, NR uses CP-OFDM (Cyclic Prefix Orthogonal Frequency Division Multiplexing) in the DL and both CP-OFDM and DFT-spread OFDM (DFT-S-OFDM) in the UL. As another example, in the time domain, NR DL and UL physical resources are organized into equal-sized 1-ms subframes. A subframe is further divided into multiple slots of equal duration, with each slot including multiple OFDM-based symbols. As another example, NR RRC layer includes RRC_IDLE and RRC_CONNECTED states, but adds an additional state known as RRC_INACTIVE, which has some similar properties as the suspended condition for LTE.

In NR, an SS/PBCH block (SSB) includes the following time-division multiplexed components, each with the duration of one symbol as follows: (a) Primary Synchronization Signal (PSS); (b) Secondary Synchronization Signal (SSS); (c) Physical Broadcast Channel (PBCH); and (d) demodulation reference signals (DM-RS) associated with PBCH. PBCH carries a small part of the system information (SI) for a cell, often referred to as the Master Information Block (MIB). An SSB may have 15, 30, 120, or 240 kHz subcarrier spacing (SCS) depending on the frequency range.

As in LTE, NR includes an absolute radio frequency channel number (ARFCN) that uniquely identifies each usable frequency channel over the entire range of available spectrum. In FDD systems, separate ARFCNs are used for DL and UL, while a single ARFCN number applies to both DL and UL in TDD systems. NR also includes a global synchronization channel number (GSCN) that uniquely identifies each possible frequency position for an SSB (referred to as SSREF). In other words, each GSCN corresponds to a unique SSREF, and vice versa. While covering the same spectrum, GSCN has a coarser granularity (or frequency step size) than ARFCN, facilitating faster UE cell search.

In general, once a UE finds an SSB at a GSCN and receives the MIB carried by the PBCH, the UE can interpret the content of the MIB such that the UE can receive further SI for the cell, particularly SI Block 1 (SIB1). However, there are certain scenarios where the content of the MIB is ambiguous for a given GSCN, which can cause issues, difficulties, and/or problems for the UE to determine how to receive SIB1 and subsequently access the cell to obtain services.

SUMMARY

Embodiments of the present disclosure provide specific improvements to communication between user equipment (UE) and network nodes in a wireless communication network, such as by facilitating solutions to overcome the exemplary problems described above.

Some embodiments of the present disclosure include methods (e.g., procedures) for receiving system information (SI) associated with a cell in a wireless network. These exemplary methods can be performed by a user equipment (UE, e.g., wireless device, IoT device, modem, etc. or component thereof).

These exemplary methods can include receiving, from the wireless network, a master information block (MIB) including SI associated with the cell. The MIB can be applicable to both a first frequency band and a second frequency band that have a common frequency range. In some embodiments, the first frequency band can be a licensed-access band, and the second frequency band can be a shared-spectrum channel access or unlicensed-access band. These exemplary methods can also include determining whether the MIB applies to the first frequency band or the second frequency band.

In some embodiments, the MIB can include a first SI field and a second SI field. In such embodiments, these exemplary methods can also include, based on determining that the MIB applies to the second frequency band, interpreting the first and second SI fields as a parameter indicating a quasi-co-location (QCL) relationship between synchronization signal/physical broadcast channel blocks (SSBs) associated with the cell.

In some embodiments, the MIB can include a third SI field related to a physical control channel configuration associated with a system information block (SIB, e.g., SIB1) that includes further SI. In some of these embodiments, the physical control channel configuration can include a first number of consecutive frequency-domain resource blocks and a second number of consecutive time-domain symbols.

In some of these embodiments, these exemplary methods can also include, based on determining that the MIB applies to the first frequency band, interpreting the third SI field as indicating a first table from which the physical control channel configuration can be determined; and, based on determining that the MIB applies to the second frequency band, interpreting the third SI field as indicating a second table from which the physical control channel configuration can be determined.

Furthermore, in some of these embodiments, these exemplary methods can also include determining the physical control channel configuration based on the first table or the second table, and receiving scheduling information for the SIB, via the physical control channel, based on the determined physical control channel configuration.

In some of these embodiments (i.e., where the MIB includes the third SI field), the determining operations can include, based on a hypothesis that the MIB applies to one of the first and second frequency bands, attempting to receive the SIB based on a physical control channel configuration corresponding to the one of the first and second frequency bands. The UE can determine that the MIB applies to the one of the first and second frequency bands when the attempt to receive the SIB is successful, and determine that the MIB applies to the other of the first and second frequency bands when the attempt to receive the SIB is unsuccessful.

In some embodiments, these exemplary methods can also include receiving, from the wireless network on a first frequency in the common frequency range, an SSB associated with the cell. In some of these embodiments, the first frequency can be associated with a global synchronization channel number (GSCN). In such embodiments, the determining operations can include determining that the MIB applies to the first frequency band when the GSCN is one of a first set of values and determining that the MIB applies to the second frequency band when the GSCN is one of a second set of values. For example, one of the first and second sets can be even-numbered GSCNs and the other of the first and second sets can be odd-numbered GSCNs.

In other of these embodiments, the synchronization signal can include a primary synchronization signal (PSS) and a secondary synchronization signal (SSS), where the PSS is associated with a PSS code and the SSS is associated with an SSS code. In such embodiments, the determining operations can include detecting a PSS code and/or an SSS code associated with the received synchronization signal; determining that the MIB applies to the first frequency band when the detected PSS code and/or the detected SSS code is part of a first set of codes; and determining that the MIB applies to the second frequency band when the detected PSS code and/or the detected SSS code is part of a second set of codes. In various embodiments, the first and second sets of codes can be non-overlapping sets of one of the following: PSS codes; SSS codes; or combinations of PSS codes and SSS codes.

In some embodiments, the MIB can be received in a physical broadcast channel (PBCH) payload, together with a PBCH cyclic redundancy check (CRC) field associated with the PBCH payload. In some of these embodiments, the determining operations can include determining that the MIB applies to the first frequency band when bits of the PBCH CRC field are ordered according to a first ordering and determining that the MIB applies to the second frequency band when bits of the PBCH CRC field are ordered according to a second ordering. The first ordering can be different from the second ordering.

In other of these embodiments, the determining operations can include determining that the MIB applies to the first frequency band when the PBCH CRC field and/or the PBCH payload are scrambled according to a first scrambling and determining that the MIB applies to the second frequency band when the PBCH CRC field and/or the PBCH payload are scrambled according to a second scrambling. The first scrambling can be different from the second scrambling.

In some embodiments, the PBCH can be associated with a demodulation reference signal (DMRS) sequence, with each DMRS in the DMRS sequence being assigned to a particular location in a time-frequency grid. In such embodiments, the UE can determine that the MIB applies to the first frequency band when the DMRS in the DMRS sequence are ordered according to a first ordering and/or are assigned to a first set of locations in the time-frequency grid. Similarly, the UE can determine the MIB applies to the second frequency band when the DMRS in the DMRS sequence are ordered according to a second ordering that is different than the first ordering, and/or are assigned to a second set of locations in the time-frequency grid, different from the first set.

In some embodiments, the MIB can include fourth, fifth, and sixth SI fields related to characteristics other than the frequency band of the cell. In such embodiments, the determining operations can be based on at least one of the fourth, fifth, and sixth SI fields.

In some of these embodiments, the fourth SI field can indicate a starting symbol for DMRS. In such embodiments, the determining operations can include determining that the MIB applies to the first frequency band when the fourth SI field indicates a first starting symbol and determining that the MIB applies to the second frequency band when the fourth SI field indicates a second starting symbol that is different from the first starting symbol.

In other of these embodiments, the fifth SI field can indicate whether the cell is barred for access and the sixth SI field can indicate whether a further cell, at the first frequency, can be accessed within a time period. In such embodiments, the determining operations can include (particularly when the fifth SI field indicates the cell is not barred for access) determining that the MIB applies to the first frequency band when sixth SI field indicates that the further cell cannot be accessed within the time period and determining that the MIB applies to the second frequency band when sixth SI field indicates that the further cell can be accessed within the time period.

In some of these embodiments (i.e., with the fifth and sixth SI fields in MIB), the determining operations can be performed when the fifth SI field indicates the cell is not barred for access.

Other embodiments of the present disclosure include methods (e.g., procedures) for transmitting system information (SI) associated with a cell in a wireless network. These exemplary methods can be performed by a network node (e.g., base station, eNB, gNB, etc., or component thereof) serving the cell in the wireless network (e.g., E-UTRAN, NG-RAN).

These exemplary methods can include transmitting a MIB including SI associated with the cell. The MIB can be applicable to both a first frequency band and a second frequency band that have a common frequency range. In some embodiments, the first frequency band can be a licensed-access band, and the second frequency band can be a shared-spectrum channel access or unlicensed-access band. These exemplary methods can also include indicating whether the MIB applies to the first frequency band or the second frequency band. This indication can be done according to various embodiments, based on one or more of the following: information associated with a physical broadcast channel (PBCH) carrying the MIB; a synchronization signal associated with the cell; and SI fields, in the MIB, related to characteristics other than the frequency band of the cell.

In some embodiments, the MIB can include a first SI field and a second SI field. In such embodiments, these exemplary methods can also include, when indicating that the MIB applies to the second frequency band, encoding in the first and second SI fields a parameter indicating a quasi-co-location (QCL) relationship between synchronization signal/ physical broadcast channel blocks (SSBs) associated with the cell.

In some embodiments, the MIB can include a third SI field related to a physical control channel configuration associated with a system information block (SIB) that includes further SI. In some of these embodiments, the physical control channel configuration can include a first number of consecutive frequency-domain resource blocks and a second number of consecutive time-domain symbols.

In some of these embodiments, these exemplary methods can also include, when indicating that the MIB applies to the first frequency band, encoding in the third SI field an indicator of a first table from which the physical control channel configuration can be determined. In such embodiments, these exemplary methods can also include, when indicating that the MIB applies to the second frequency band, encoding in the third SI field an indicator of a second table from which the physical control channel configuration can be determined. Furthermore, in some of these embodiments, these exemplary methods can also include transmitting scheduling information for the SIB, via the physical control channel, based on the physical control channel configuration according to the indicator in the third SI field.

In some embodiments, these exemplary methods can also include transmitting, on a first frequency in the common frequency range, an SSB associated with the cell. In some of these embodiments, the first frequency can be associated with a global synchronization channel number (GSCN). In such embodiments, the indicating operations can include indicating that the MIB applies to the first frequency band when the GSCN is one of a first set of values and indicating that the MIB applies to the second frequency band when the GSCN is one of a second set of values. For example, one of the first and second sets can be even-numbered GSCNs and the other of the first and second sets can be odd-numbered GSCNs.

In other of these embodiments, the SSB can include a primary synchronization signal (PSS) and a secondary synchronization signal (SSS), where the PSS is associated with a PSS code and the SSS is associated with an SSS code. In such embodiments, the indicating operations can include selecting the PSS code and/or the SSS code from a first set of codes when the MIB applies to the first frequency band and selecting the PSS code and/or the SSS code from a second set of codes when the MIB applies to the second frequency band. In various embodiments, the first and second sets of codes can be non-overlapping sets of one of the following: PSS codes; SSS codes; or combinations of PSS codes and SSS codes.

In some embodiments, the MIB can be transmitted in a physical broadcast channel (PBCH) payload together with a PBCH cyclic redundancy check (CRC) field associated with the PBCH payload. In some of these embodiments, the indicating operations can include ordering bits of the PBCH CRC field according to a first ordering when the MIB applies to the first frequency band and ordering bits of the PBCH CRC field according to a second ordering when the MIB applies to the second frequency band. The first ordering can be different from the second ordering.

In other of these embodiments, the indicating operations can include scrambling at least one of the PBCH CRC field and the PBCH payload according to a first scrambling when the MIB applies to the first frequency band and scrambling at least one of the PBCH CRC field and the PBCH payload according to a second scrambling when the MIB applies to the second frequency band. The first scrambling can be different from the second scrambling.

In some embodiments, the PBCH can be associated with a demodulation reference signal (DMRS) sequence, with each DMRS in the DMRS sequence being assigned to a particular location in a time-frequency grid. In such embodiments, the network node can indicate that the MIB applies to the first frequency band based on ordering the DMRS according to a first ordering and/or assigning the DMRS to a first set of locations in the time-frequency grid. Similarly, the network node can indicate that the MIB applies to the second frequency band based on ordering the DMRS according to a second ordering that is different than the first ordering, and/or assigning the DMRS to a second set of locations in the time-frequency grid, different from the first set.

In some embodiments, the MIB can include fourth, fifth, and sixth SI fields related to characteristics other than the frequency band of the cell. In such embodiments, the indicating operations can be based on at least one of the fourth, fifth, and sixth SI fields.

In some of these embodiments, the fourth SI field can indicate a starting symbol for DMRS. In such embodiments, the indicating operations can include indicating, in the fourth SI field, a first starting symbol when the MIB applies to the first frequency band; and indicating, in the fourth SI field, a second starting symbol when the MIB applies to the second frequency band. The second starting symbol is different from the first starting symbol.

In other of these embodiments, the fifth SI field can indicate whether the cell is barred for access and the sixth SI field can indicate whether a further cell, at the first frequency, can be accessed within a time period. In such embodiments, the indicating operations can include (particularly when the fifth SI field indicates the cell is not barred for access) indicating, in sixth SI field, that the further cell cannot be accessed within the time period when the MIB applies to the first frequency band; and indicating, in sixth SI field, that the further cell can be accessed within the time period when the MIB applies to the second frequency band.

In some of these embodiments (i.e., with the fifth and sixth SI fields in MIB), indicating whether the MIB applies to the first frequency band or the second frequency can be conditioned upon the fifth SI field indicating that the cell is not barred for access.

Other embodiments include user equipment (UEs, e.g., wireless devices, IoT devices, or components thereof, such as a modem) and network nodes (e.g., base stations, eNBs, gNBs, ng-eNBs, CU/DUs, controllers, etc.) configured to perform operations corresponding to any of the exemplary methods described herein. Other embodiments include non-transitory, computer-readable media storing program instructions that, when executed by processing circuitry, configure such UEs or network nodes to perform operations corresponding to any of the exemplary methods described herein.

These and other aspects, features, benefits, and/or advantages of embodiments of the present disclosure will become apparent upon reading the following Detailed Description in view of the Drawings briefly described below.

BRIEF DESCRIPTION OF THE DRAWINGS

FIG. 4 shows an exemplary time-frequency resource grid for a New Radio (NR) slot.

FIGS. 5A-5B show two exemplary NR slot configurations.

FIG. 6 shows an ASN.1 data structure representing an exemplary master information block (MIB) for an NR cell.

FIG. 7, which includes FIGS. 7A and 7B, illustrates two exemplary frequency band arrangements.

FIG. 10, which includes FIGS. 10A-10B, shows a flow diagram of an exemplary method (e.g., procedure) performed by a user equipment (UE, e.g., wireless device, MTC device, NB-IoT device, modem, etc. or component thereof), according to various embodiments of the present disclosure.

FIG. 11, which includes FIGS. 11A-11B, shows a flow diagram of an exemplary method (e.g., procedure) performed by a network node (e.g., base station, gNB, eNB, ng-eNB, etc. or component thereof) of a wireless network (e.g., E-UTRAN, NG-RAN), according to various embodiments of the present disclosure.

FIGS. 15-18 are flow diagrams of exemplary methods (e.g., procedures) for transmission and/or reception of user data (e.g., for an OTT data service), according to various embodiments of the present disclosure.

DETAILED DESCRIPTION

Figure 1:
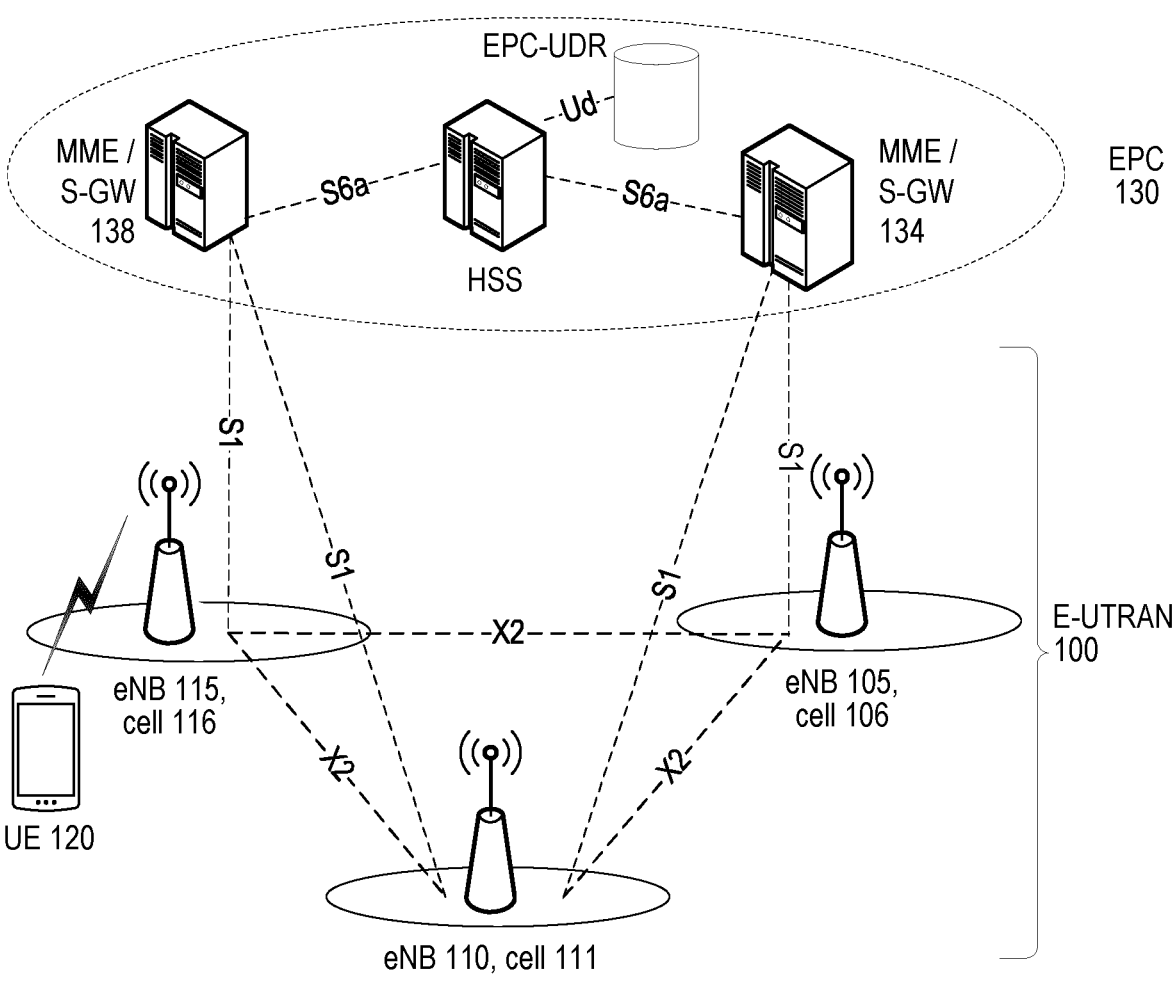
FIG. 1 is a high-level block diagram of an exemplary architecture of the Long-Term Evolution (LTE) Evolved UTRAN (E-UTRAN) and Evolved Packet Core (EPC) network, as standardized by 3 GPP.
Figure 2:
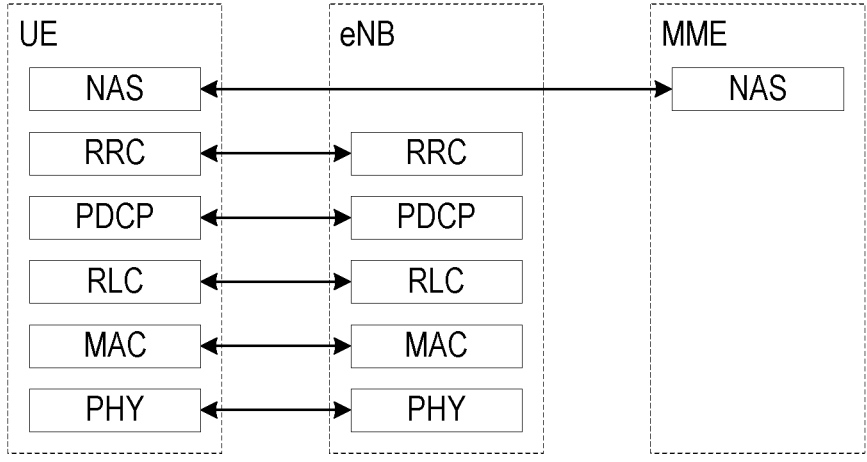
FIG. 2 is a block diagram of exemplary protocol layers of the control-plane portion of the radio (Uu) interface between a user equipment (UE) and the E-UTRAN.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, once a UE finds an SSB at a GSCN and receives the MIB carried by the PBCH, the UE can interpret the content of the MIB in a manner that allows the UE to receive further SI for the cell, particularly SIB 1. However, there are certain scenarios where the content of the MIB is ambiguous for a given GSCN. This ambiguity can cause issues, difficulties, and/or problems for the UE in determining how to receive SIB1 and subsequently access the cell to obtain desired services. This is discussed in more detail below after the following introduction to 5G/NR technology.

Figure 3:
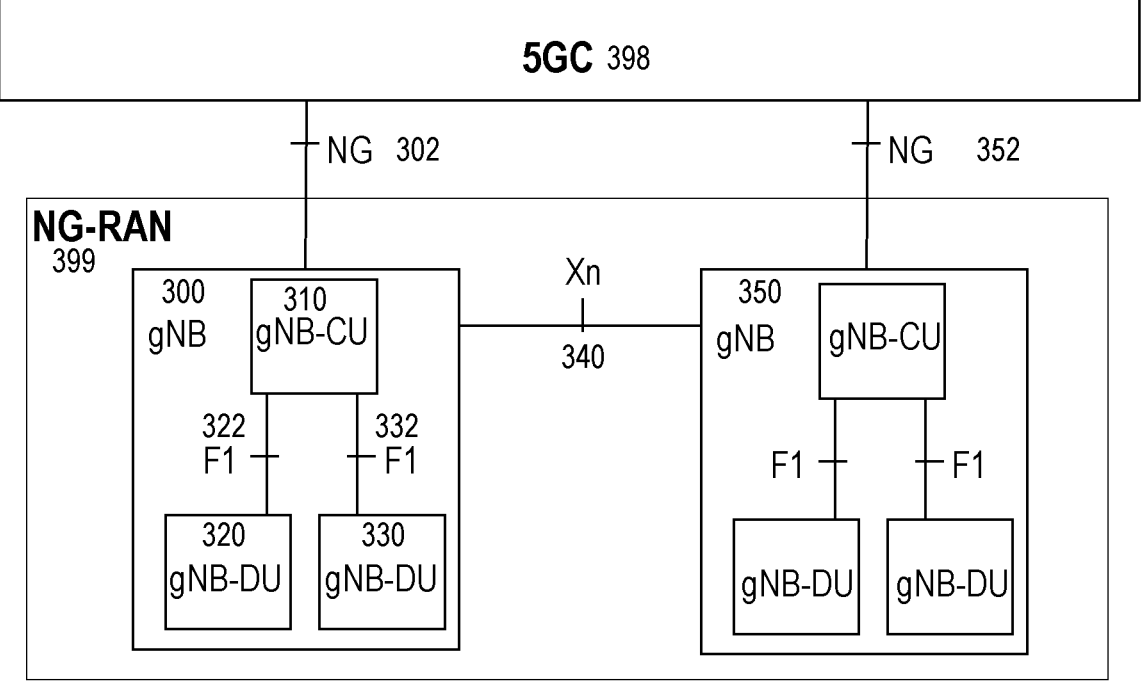
FIG. 3 illustrates a high-level view of an exemplary 5G network architecture.

FIG. 3 shows a high-level view of an exemplary 5G network architecture, including a Next Generation RAN (NG-RAN) 399 and a 5G Core (5GC) 398. NG-RAN 399 can include one or more gNodeB's (gNBs) connected to the 5GC via one or more NG interfaces, such as gNBs 300, 350 connected via interfaces 302, 352, respectively. More specifically, gNBs 300, 350 can be connected to one or more Access and Mobility Management Functions (AMY) in the 5GC 398 via respective NG-C interfaces. Similarly, gNBs 300, 350 can be connected to one or more User Plane Functions (UPFs) in 5GC 398 via respective NG-U interfaces.

Although not shown, in some deployments 5GC 398 can be replaced by an Evolved Packet Core (EPC), which conventionally has been used together with LTE E-UTRAN. In such deployments, gNBs 300, 350 can connect to one or more Mobility Management Entities (MMEs) in EPC 398 via respective S1-C interfaces. Similarly, gNBs 300, 350 can connect to one or more Serving Gateways (SGWs) in EPC via respective NG-U interfaces.

In addition, the gNBs can be connected to each other via one or more Xn interfaces, such as Xn interface 340 between gNBs 300 and 350. The radio technology for the NG-RAN is often referred to as "New Radio" (NR). With respect to the NR interface to UEs (also referred to as the "Uu interface"), each of the gNBs can support frequency division duplexing (FDD), time division duplexing (TDD), or a combination thereof. The radio-related protocols between UEs and the NG-RAN over the Uu interface are generally referred to as the access stratum (AS), while the protocols between UEs and the core network (e.g., 5GC or EPC) are generally referred to as the non-access stratum (NAS).

NG-RAN 399 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (e.g., NG, Xn, F1) the related TNL protocol and the functionality are specified. The TNL provides services for user plane transport and signaling transport. In some exemplary configurations, each gNB is connected to all 5GC nodes within an "AMF Region" which is defined in 3GPP TS 23.501. If security protection for CP and UP data on TNL of NG-RAN interfaces is supported, NDS/IP shall be applied.

The NG RAN logical nodes shown in FIG. 3 include a Central Unit (CU or gNB-CU) and one or more Distributed Units (DU or gNB-DU). For example, gNB 300 includes gNB-CU 310 and gNB-DUs 320 and 330. CUs (e.g., gNB-CU 310) are logical nodes that host higher-layer protocols and perform various gNB functions such controlling the operation of DUs. A DU (e.g., gNB-DUs 320, 330) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to one or more gNB-DUs over respective F1 logical interfaces, such as interfaces 322 and 332 shown in FIG. 3. However, a gNB-DU can be connected to only a single gNB-CU. The gNB-CU and connected gNB-DU(s) are only visible to other gNBs and the 5GC as a gNB. In other words, the F1 interface is not visible beyond gNB-CU.

In Rel-15, an NR UE can be configured with up to four carrier bandwidth parts (BWPs) in the DL with a single DL BWP being active at a given time. A UE can be configured with up to four BWPs in the UL with a single UL BWP being active at a given time. If a UE is configured with a supplementary UL, the UE can be configured with up to four additional BWPs in the supplementary UL, with a single supplementary UL BWP being active at a given time.

Common RBs (CRBs) are numbered from 0 to the end of the carrier bandwidth. Each BWP configured for a UE has a common reference of CRB0, such that a configured BWP may start at a CRB greater than zero. CRB0 can be identified by one of the following parameters provided by the network, as further defined in 3GPP TS 38.211 section 4.4:

PRB-index-DL-common for DL in a primary cell (PCell, e.g., PCell or PSCell);

PRB-index-UL-common for UL in a PCell;

PRB-index-DL-Dedicated for DL in a secondary cell (SCell);

PRB-index-UL-Dedicated for UL in an SCell; and

PRB-index-SUL-common for a supplementary UL.

In this manner, a UE can be configured with a narrow BWP (e.g., 10 MHz) and a wide BWP (e.g., 100 MHz), each starting at a particular CRB, but only one BWP can be active for the UE at a given point in time. Within a BWP, PRBs are defined and numbered in the frequency domain from $$N_{BWP_j}^{size} - 1,$$

where i is the index of the particular BWP for the carrier.

Similar to LTE, each NR resource element (RE) corresponds to one OFDM subcarrier during one OFDM symbol interval. NR supports various SCS values $\Delta f = (15 \times 2^\mu)$ kHz, where $\mu \in (0, 1, 2, 3, 4)$ are referred to as "numerologies." Numerology $\mu = 0$ (i.e., $\Delta f = 15$ kHz) provides the basic (or reference) SCS that is also used in LTE. The symbol duration, cyclic prefix (CP) duration, and slot duration are inversely related to SCS or numerology. For example, there is one (1-ms) slot per subframe for $\Delta f = 15$ kHz, two 0.5-ms slots per subframe for $\Delta f = 30$ kHz, etc. In addition, the maximum carrier bandwidth is directly related to numerology according to $2^\mu {}^* 50$ MHz. Table 1 below summarizes the supported NR numerologies and associated parameters. Different DL and UL numerologies can be configured by the network.

TABLE 1

| μ | $\Delta f = 2^\mu \cdot 15$ (kHz) | Cyclic prefix (CP) | CP duration | Symbol duration | Symbol + CP | Slot duration | Max carrier BW |
|---|---|---|---|---|---|---|---|
| 0 | 15 | Normal | 4.69 μs | 66.67 μs | 71.35 μs | 1 ms | 50 MHz |
| 1 | 30 | Normal | 2.34 μs | 33.33 μs | 35.68 μs | 0.5 ms | 100 MHz |
| 2 | 60 | Normal, Extended | 1.17 μs | 16.67 μs | 17.84 μs | 0.25 ms | 200 MHz |
| 3 | 120 | Normal | 0.59 μs | 8.33 μs | 8.92 μs | 125 μs | 400 MHz |
| 4 | 240 | Normal | 0.29 μs | 4.17 μs | 4.46 μs | 62.5 μs | 800 MHz |

FIG. 4 shows an exemplary time-frequency resource grid for an NR slot. As illustrated in FIG. 4, a resource block (RB) consists of a group of 12 contiguous OFDM subcarriers for a duration of a slot, i.e., 14 OFDM symbols for normal CP and 12 symbols for extended CP. An NR slot can also be arranged with various combinations of UL and DL symbols. Options can include DL-only slots (i.e., no UL transmission) with on-time (symbol 0) or late (symbol>0) starts, "DL-heavy" slots (e.g., one UL symbol), and "UL-heavy" slot with a single DL symbol carrying DL control information. Various guard periods before initial DL symbols ($T_{UL\text{-}DL}$) and before initial UL symbols ($T_{DL\text{-}UL}$) can also be used.

FIG. 5A shows another exemplary NR slot configuration comprising 14 symbols, where the slot and symbols durations are denoted $T_s$ and $T_{symb}$, respectively. In addition, NR includes a Type-B scheduling, also known as "mini-slots." These are shorter than slots, typically ranging from one symbol up to one less than the number of symbols in a slot (e.g., 13 or 11), and can start at any symbol of a slot. Mini-slots can be used if the transmission duration of a slot is too long and/or the occurrence of the next slot start (slot alignment) is too late. Applications of mini-slots include unlicensed spectrum and latency-critical transmission (e.g., URLLC). However, mini-slots are not service-specific and can also be used for eMBB or other services.

FIG. 5B shows another exemplary NR slot structure comprising 14 symbols. In this arrangement, PDCCH is confined to a region containing a particular number of symbols and a particular number of subcarriers, referred to as the control resource set (CORESET). In the exemplary structure shown in FIG. 5B, the first two symbols contain PDCCH and each of the remaining 12 symbols contains physical data channels (PDCH), i.e., either PDSCH or PUSCH. Depending on the particular CORESET configuration (discussed below), however, the first two slots can also carry PDSCH or other information, as required.

A CORESET includes multiple RBs (i.e., multiples of 12 REs) in the frequency domain and 1-3 OFDM symbols in the time domain, as further defined in 3GPP TS 38.211 § 7.3.2.2. A CORESET is functionally similar to the control region in LTE subframe, such as illustrated in FIG. 4. In NR, however, each REG consists of all 12 REs of one OFDM symbol in a RB, whereas an LTE REG includes only four REs, as illustrated in FIG. 4. Like in LTE, the CORESET time domain size can be indicated by PCFICH. In LTE, the frequency bandwidth of the control region is fixed (i.e., to the total system bandwidth), whereas in NR, the frequency bandwidth of the CORESET is variable. CORESET resources can be indicated to a UE by RRC signaling.

The smallest unit used for defining CORESET is the REG, which spans one PRB in frequency and one OFDM symbol in time. In addition to PDCCH, each REG contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, if the precoder used at the transmitter for the REGs is not different. To assist the UE with channel estimation, the multiple REGs can be grouped together to form a REG bundle, and the REG bundle size for a CORESET (i.e., 2, 3, or 5 REGs) can be indicated to the UE. The UE can assume that any precoder used for the transmission of the PDCCH is the same for all the REGs in the REG bundle.

An NR control channel element (CCE) consists of six REGs. These REGs may either be contiguous or distributed in frequency. When the REGs are distributed in frequency, the CORESET is said to use interleaved mapping of REGs to a CCE, while if the REGs are contiguous in frequency, a non-interleaved mapping is said to be used. Interleaving can provide frequency diversity. Not using interleaving is beneficial for cases where knowledge of the channel allows the use of a precoder in a particular part of the spectrum improve the SINR at the receiver.

Similar to LTE, NR data scheduling is done on a per-slot basis. In each slot, the base station (e.g., gNB) transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant. DCI formats 0_0 and 0_1 are used to convey UL grants for PUSCH, while Other DCI formats (2_0, 2_1, 2_2 and 2_3) are used for other purposes including transmission of slot format information, reserved resource, transmit power control information, etc.

A DCI includes payload data and a cyclic redundancy check (CRC) of the payload data. Since DCI is sent on PDCCH that is received by multiple UEs, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

DCI payload together with an identifier-scrambled CRC is encoded and transmitted on the PDCCH. Given previously configured search spaces, each UE tries to detect a PDCCH addressed to it according to multiple hypotheses (also referred to as "candidates") in a process known as "blind decoding." PDCCH candidates can span 1, 2, 4, 8, or 16 CCEs, with the number of CCEs referred to as the aggregation level (AL) of the PDCCH candidate. If more than one CCE is used, the information in the first CCE is repeated in the other CCEs. By varying AL, PDCCH can be made more or less robust for a certain payload size. In other words, PDCCH link adaptation can be performed by adjusting AL. Depending on AL, PDCCH candidates can be located at various time-frequency locations in the CORESET.

A hashing function can be used to determine CCEs corresponding to PDCCH candidates that a UE must monitor within a search space set. The hashing is done differently for different UEs so that the CCEs used by the UEs are randomized, thereby reducing the probability of collisions between multiple UEs for which PDCCH messages are included in a CORESET. A monitoring periodicity is also configured for different PDCCH candidates. In any particular slot, the UE may be configured to monitor multiple PDCCH candidates in multiple search spaces which may be mapped to one or more CORESETs. PDCCH candidates may need to be monitored multiple times in a slot, once every slot or once in multiple of slots.

Once a UE decodes a DCI, it de-scrambles the CRC with RNTI(s) that is(are) assigned to it and/or associated with the particular PDCCH search space. In case of a match, the UE considers the detected DCI as being addressed to it, and follows the instructions (e.g., scheduling information) in the DCI.

For example, to determine the modulation order, target code rate, and TB size(s) for a scheduled PDSCH transmission, the UE first reads the 5-bit modulation and coding scheme field ($I_{MCS}$) in the DCI (e.g., formats 1_0 or 1_1) to determine the modulation order ($Q_m$) and target code rate (R) based on the procedure defined in 3GPP TS 38.214 V15.0.0 clause 5.1.3.1. Subsequently, the UE reads the redundancy version field (rv) in the DCI to determine the redundancy version. Based on this information together with the number of layers (υ) and the total number of allocated PRBs before rate matching ($n_{PRB}$), the UE determines the Transport Block Size (TB S) for the PDSCH according to the procedure defined in 3GPP TS 38.214 V15.0.0 clause 5.1.3.2. A UE can use similar techniques for PUSCH transmission scheduled by DCI (e.g., formats 0_0 or 0_1).

DCI can also include information about various timing offsets (e.g., in slots or subframes) between PDCCH and PDSCH, PUSCH, HARQ, and/or CSI-RS. For example, offset K0 represents the number of slots between the UE's PDCCH reception of a PDSCH scheduling DCI (e.g., formats 1_0 or 1_1) and the subsequent PDSCH transmission. Likewise, offset K1 represents the number of slots between this PDSCH transmission and the UE's responsive HARQ ACK/NACK transmission on the PUSCH. In addition, offset K3 represents the number of slots between this responsive ACK/NACK and the corresponding retransmission of data on PDSCH. In addition, offset K2 represents the number of slots between the UE's PDCCH reception of a PUSCH grant DCI (e.g., format 0_0 or 0_1) and the subsequent PUSCH transmission. Each of these offsets can take on values of zero and positive integers.

As mentioned above, PBCH carries a small part of the system information (SI) for a cell, often referred to as the Master Information Block (MIB). FIG. 6 shows an ASN.1 data structure representation of an exemplary MIB for an NR cell. As can be seen in FIG. 6, the exemplary MIB includes a PDCCH-ConfigSIB1, which includes controlResourceSetZero and searchSpaceZero fields describing the CORESET and search space configuration, respectively, of the PDCCH that carries scheduling information for SIB1.

In general, SIB1 is scheduled on PDSCH by a PDCCH scrambled with SI-RNTI in the Type0-PDCCH common search space (CSS) set. If during cell search a UE determines from MIB that a CORESET for Type0-PDCCH CSS set is present (as described in 3GPP TS 38.213 section 4.1), the UE determines a number of consecutive RBs and a number of consecutive time-domain symbols for the CORESET of the Type0-PDCCH CSS set from controlResourceSetZero, as described in 3GPP TS 38.213 Tables 13-1 through 13-10. The UE also determines PDCCH monitoring occasions from searchSpaceZero as described in 38.213 Tables 13-11 through 13-15.

The UE determines which of Tables 13-1 through 13-10 to use based on a combination of SSB SCS (as defined in 3GPP TS 38.101-1 per band) and PDCCH (as indicated by MIB field subCarrierSpacingCommon and the frequency range FR1/FR2), together with the minimum channel bandwidth (as defined in 3GPP TS 38.101-1 per band). There are a number of exceptions where 3GPP TS 38.101-1 defines two different SSB SCS for a given band. For those cases the UE needs to try both possible SCS when detecting the SSB.

Depending on the deployment, beamforming may be used to distribute SSB over the coverage area of a cell. For example, each SSB instance can be beamformed in a certain direction, either to ensure coverage or to provide beam finding support for subsequent link establishment. For improving coverage (or beam finding), the SSB may be transmitted sequentially through pre-determined beam patterns that together cover the desired area, which is referred to as "beam sweeping." Individual SSBs within an SSB burst (e.g., over a coverage area of a cell) are identified by an SSB-Index, as defined in 3GPP TS 38.331.

As mentioned above, GSCN—also referred to as "synchronization raster"—indicates the frequency positions of SSB that can be used by the UE for system acquisition, particularly when explicit signaling of the SSB position is not present. A global synchronization raster is defined for all usable frequencies, with each SSB frequency position SSREF associated with a corresponding GSCN. Table 2 below (which is 3GPP TS 38.101-1 Table 5.4.3.1-1) shows a relationship between frequency range, SSREF, and GSCN. Note that the default value for operating bands with SCS spaced channel raster is M=3.

17

TABLE 2

| Frequency range | SS Block frequency position $SS_{REF}$ | GSCN | Range of GSCN |
|---|---|---|---|
| 0-3000 MHz | $N * 1200$ kHz + $M * 50$ kHz, $N = 1{:}2499$, $M \in \{1, 3, 5\}$ | $3N + (M - 3)/2$ | 2-7498 |
| 3000-24250 MHz | 3000 MHz + $N * 1.44$ MHz $N = 0{:}14756$ | $7499 + N$ | 7499-22255 |

Table 3 below (which is Table 5.4.3.3-1 from 3GPP TS 38.101-1) shows the application synchronization signal (SS) raster entries per NR operating band. The distance between applicable GSCN entries is given by the <Step size> indicated in Table 3. The SSB pattern is defined in 3GPP TS 38.213. For the currently defined NR bands, above, for a given GSCN/SSREF, once the UE has determined the SSB SCS from Table 3 (for some cases by testing two hypothesis), the UE can interpret the MIB contents, and thus the steps to read SIB1, unambiguously.

TABLE 3

| NR operating band | SSB SCS | SSB pattern[1] | Range of GSCN (First-<Step size>-Last) |
|---|---|---|---|
| n1 | 15 kHz | Case A | 5279-<1>-5419 |
| n2 | 15 kHz | Case A | 4829-<1>-4969 |
| n3 | 15 kHz | Case A | 4517-<1>-4693 |
| n5 | 15 kHz | Case A | 2177-<1>-2230 |
|  | 30 kHz | Case B | 2183-<1>-2224 |
| n7 | 15 kHz | Case A | 6554-<1>-6718 |
| n8 | 15 kHz | Case A | 2318-<1>-2395 |
| n12 | 15 kHz | Case A | 1828-<1>-1858 |
| n20 | 15 kHz | Case A | 1982-<1>-2047 |
| n25 | 15 kHz | Case A | 4829-<1>-4981 |
| n28 | 15 kHz | Case A | 1901-<1>-2002 |
| n34 | 15 kHz | Case A | 5030-<1>-5056 |
| n38 | 15 kHz | Case A | 6431-<1>-6544 |
| n39 | 15 kHz | Case A | 4706-<1>-4795 |
| n40 | 15 kHz | Case A | 5756-<1>-5995 |
| n41 | 15 kHz | Case A | 6246-<3>-6717 |
|  | 30 kHz | Case C | 6252-<3>-6714 |
| n50 | 15 kHz | Case A | 3584-<1>-3787 |
| n51 | 15 kHz | Case A | 3572-<1>-3574 |
| n66 | 15 kHz | Case A | 5279-<1>-5494 |
|  | 30 kHz | Case B | 5285-<1>-5488 |
| n70 | 15 kHz | Case A | 4993-<1>-5044 |
| n71 | 15 kHz | Case A | 1547-<1>-1624 |
| n74 | 15 kHz | Case A | 3692-<1>-3790 |
| n75 | 15 kHz | Case A | 3584-<1>-3787 |
| n76 | 15 kHz | Case A | 3572-<1>-3574 |
| n77 | 30 kHz | Case C | 7711-<1>-8329 |
| n78 | 30 kHz | Case C | 7711-<1>-8051 |
| n79 | 30 kHz | Case C | 8480-<16>-8880 |

As part of Rel-16 operation with shared-spectrum (or unlicensed) channel access, a new table for determining the number of consecutive resource blocks and a number of consecutive symbols for the CORESET of the Type0-PDCCH CSS has been introduced. In addition, it has been agreed that the UE should reinterpret bits in the Rel-15 MIB to derive a new parameter Q (also known as ssb-QCL-Relation). In particular, for signaling of Q for a serving cell with possible values {1,2,4,8}, the following is supported:

If RAN2 agrees to use the spare bit and still allow release independent introduction of the 6 GHz band, then Alt 1-4 is supported, otherwise Alt 1-2 is supported:

Alt 1-2: For operation with shared spectrum channel access, the UE interprets the following 2 bits of the Rel-15 MIB for providing the value of Q

18 ssbSubcarrierSpacingCommon (1 bit)
LSB of ssb-SubcarrierOffset (1 bit)

Alt 1-4: For operation with shared spectrum channel access, the UE interprets the 2 bits in the following two fields of the Rel-15 MIB for providing the value of Q ssbSubcarrierSpacingCommon (1 bit)
spare (1 bit)

Furthermore, both Europe (ECC) and the U.S. (FCC) are defining regulation for new bands in the 5.925-7.125 GHz range. FIG. 7A shows an exemplary band arrangement for a draft FCC proposal, while FIG. 7B shows an exemplary band arrangement for a draft ECC proposal. As indicated in FIG. 7A, the upper part of this range (i.e., 6.425-7.125 GHz) will be unlicensed or shared spectrum in the U.S. The disposition of this upper part has not been determined in Europe, but it is likely to be allocated as licensed spectrum Accordingly, it is likely that two bands will be defined for this frequency range, one unlicensed band in the U.S and one unlicensed band in Europe. If a given GSCN in this range maps to two bands for which the MIB bits should be interpreted in different ways (e.g., according to existing Tables 13-1 to 13-10 or a newly defined table), the UE will not know how to interpret a MIB at such GSCNs. This affects not only which table to use when determining the CORESET configuration, but also whether MIB bits should be reinterpreted (as discussed above) to indicate the parameter Q (ssb-QCL-Relation).

Put differently, if a UE finds an SSB at a GSCN that is valid both for a licensed European band and an unlicensed US band (e.g., in 6.425-7.125 GHz), the UE doesn't know if some of the bits should be reinterpreted to signal the new parameter Q or if the bits should be interpreted in a conventional manner (e.g., as in Rel-15). Likewise, the UE doesn't know which table to apply—the ones corresponding to licensed band operation as in Rel-15, or the newly defined table for unlicensed operation in Rel-16.

Embodiments of the present disclosure address these and other problems, issues, and/or drawbacks by providing novel, flexible, and efficient techniques for indicating (e.g., by a network node) or determining (e.g., by a UE) which of a plurality of interpretations should be applied to a received MIB. The plurality of the interpretations corresponds to a plurality of frequency bands that overlap in a frequency range. These embodiments can facilitate correct UE operation in scenarios in which overlapping frequency bands have different characteristics as expressed in the MIB, such as the overlapping licensed European band and unlicensed U.S. band in the 6.425-7.125 GHz range discussed above. Without such embodiments, a UE that receives a MIB on a PBCH associated with an SSREF in the overlapping bands may interpret the MIB incorrectly. This can result in the UE performing operations that are incompatible with the actual frequency band (e.g., operating according to unlicensed rules rather than licensed rules), which can impact the performance and/or functionality of the UE, other UEs in the band, and/or the network.

Figure 8:
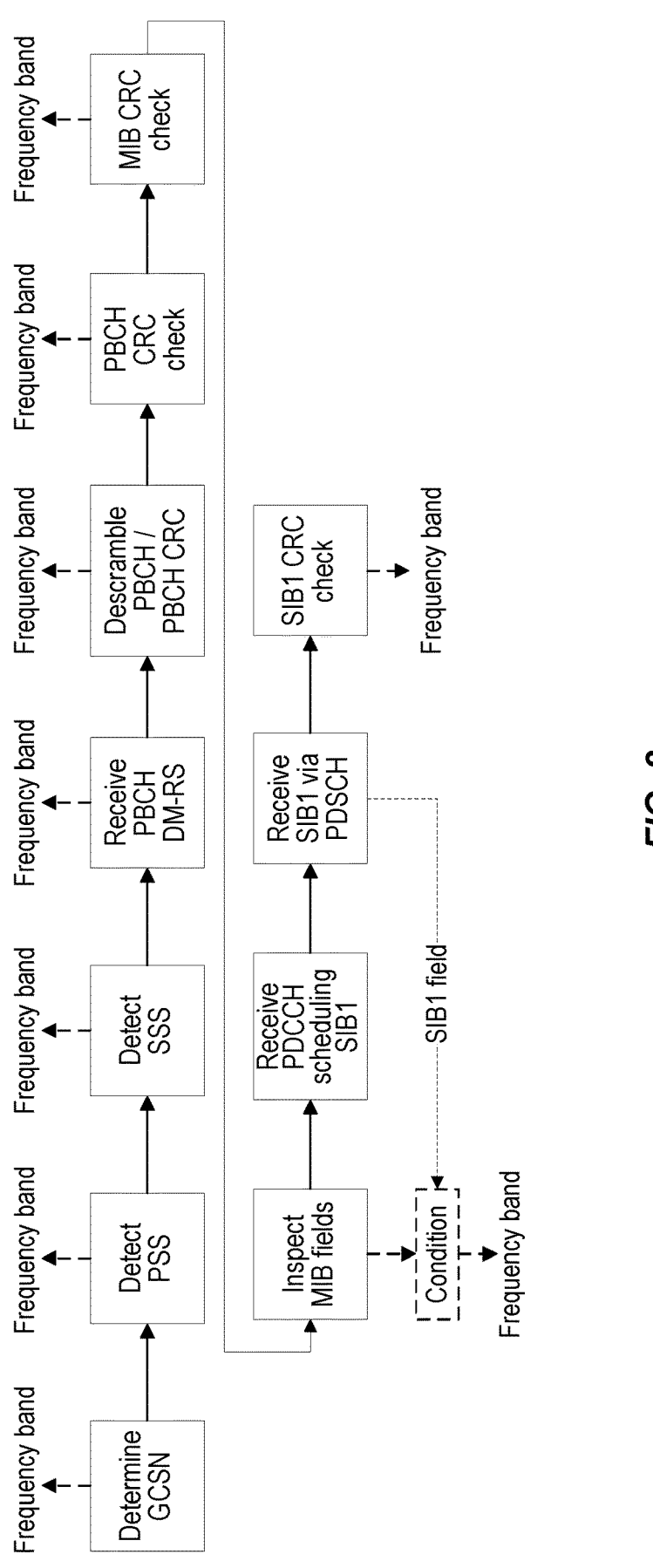
FIG. 8 shows an exemplary sequence of functional blocks for MIB and system information block 1 (SIB1) reception by a UE, according to various exemplary embodiments of the present disclosure.
Figure 9:
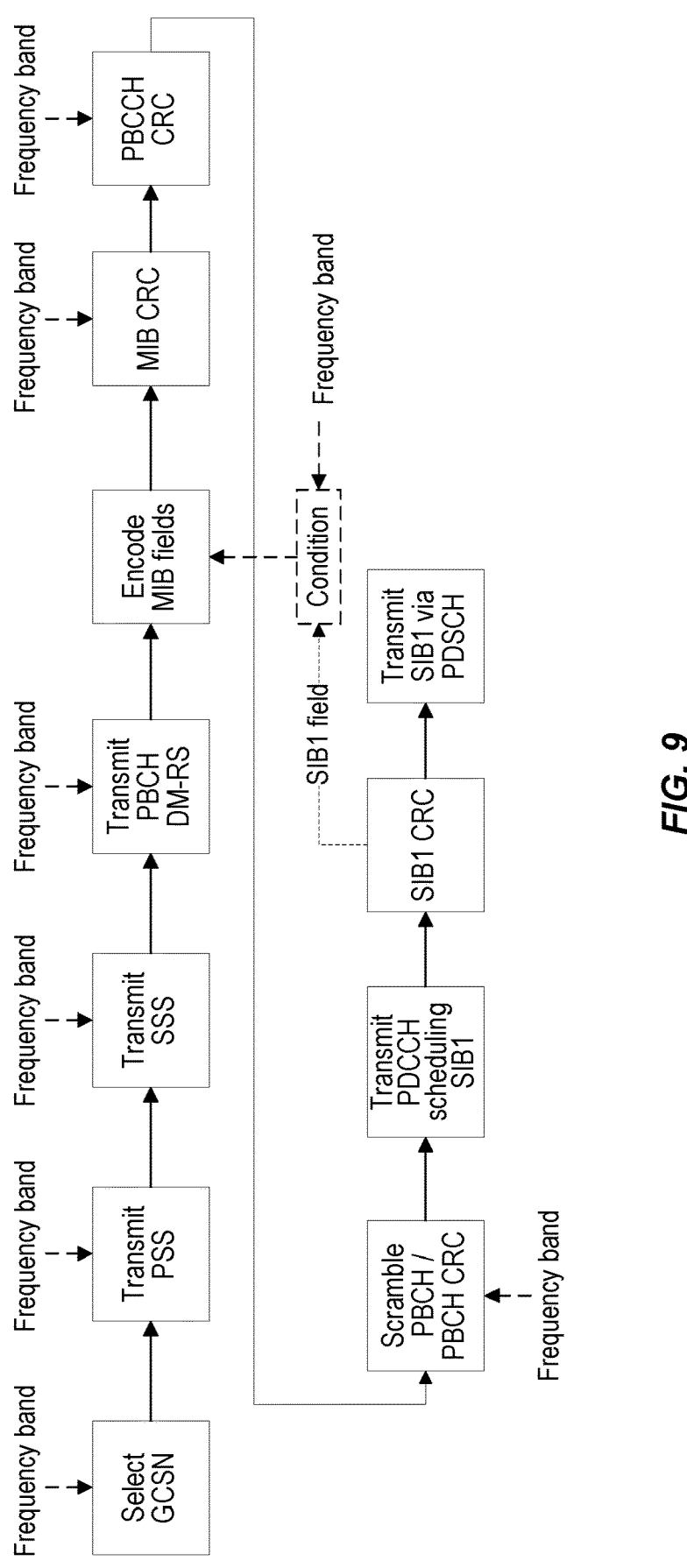
FIG. 9 shows an exemplary sequence of functional blocks for MIB and SIB1 transmission by a network node, according to various exemplary embodiments of the present disclosure.

FIG. 8 shows an exemplary sequence of functional blocks for MIB and SIB1 reception by a UE, according to various exemplary embodiments of the present disclosure. In addition, FIG. 9 shows an exemplary sequence of functional blocks in for MIB and SIB1 transmission by a network node, according to various exemplary embodiments of the present disclosure. Note that the functional blocks in FIG. 9 are intended to be complementary to the functional blocks in FIG. 8 (and vice versa), such that a UE receiver and a network node transmitter embodying such blocks can be used cooperatively to provide benefits and/or advantages disclosed herein.

Various blocks in FIG. 8 are shown as producing an output of a "frequency band", while various blocks in FIG. 9 are shown as receiving an input of a "frequency band." Each of these instances is shown with a dashed line, meaning that the output (or input) of the "frequency band" to the corresponding block is optional. In other words, a "frequency band" can be output from (or input to) one or more of these blocks, provided that the same block(s) is(are) used for this purpose in both the UE receiver and the network transmitter, so as to provide compatibility and/or interoperability.

In FIG. 8, the UE first determines a GSCN, then detects a PSS and SSS on the GSCN. Next, the UE receives DMRS associated with the PBCH, which facilitates UE reception of the PBCH itself. In some embodiments, the UE may descramble the PBCH payload and/or a cyclic redundancy check (CRC) of the PBCH. The UE performs a CRC check of the CRC payload and, if the CRC check passes, decodes the MIB from the payload and checks the MIB CRC (if present). Next, the UE inspects the MIB fields (e.g., shown in FIG. 6) and determines the PDCCH configuration associated with the scheduling PDCCH for SIB. The UE then receives PDCCH according to this configuration, then receives SIB1 in PDSCH according to the scheduling information in PDCCH. Finally, the UE can perform a CRC check of SIB1, the result of which indicates whether or not SIB 1 was successfully received.

Similarly, in FIG. 9, the network node transmits a PSS, SSS, PBCH, and PBCH DMRS on a selected GSCN/SSREF. The PBCH includes the PBCH payload and a CRC of the PBCH payload. The PBCH payload include the MIB fields and, in some cases, a CRC of the MIB. In some cases, the network node may scramble the PBCH payload and/or the PBCH CRC. The network node also transmits a scheduling PDCCH for SIB1, as well as a PDSCH with SIB1 (and SIB1 CRC) according to the scheduling PDCCH. SIB1 can have various fields, as discussed below.

In some embodiments, the UE can hypothesize two (or more than two, in general) interpretations for the bits in decoded MIB (i.e., when PBCH CRC passed). The UE then attempts SIB1 decoding based on the first interpretation of the bits in the MIB. If SIB1 reading is successful (SIB1 CRC passed) the UE determines that the first interpretation was the correct one. If SIB1 reading is not successful after a predefined number of attempts or after a predefined duration, the UE attempts decoding according to the second (next) interpretation. If SIB1 reading still fails after attempting SIB1 decoding based on all hypothesis, the UE determines that SIB1 reading failed and acts according to conventional procedures associated with SIB1 failure.

In some embodiments, the CRC of the PBCH carrying MIB can be scrambled differently for the different interpretations of the MIB bits. The UE then evaluates the PBCH CRC based on the two or more scrambling hypothesis and, based on which one that passes, determines which interpretation of the MIB bits to apply.

In other embodiments, different ordering of the PBCH CRC bits can correspond to the different interpretations of the MIB bits. For example, the order of the CRC bits can be reversed for the case of two frequency-band hypotheses (e.g., licensed and unlicensed).

In other embodiments, the PBCH payload bits can be scrambled differently for the different interpretations of the MIB bits. The UE then evaluates the PBCH CRC based on the two or more scrambling hypothesis and based on which one that passes, determines the correct interpretation of the MIB bits.

In some embodiments, the PBCH DM-RS sequence can be different for the different interpretations of the MIB bits. The UE then evaluates which of the two or more PBCH DM-RS sequence hypotheses that correlates best to the received DMRS sequence and selects the interpretation of the MIB bits that corresponds to this "best" hypothesis. In other embodiments, the UE can attempt PBCH decoding based on the two or more PBCH DM-RS sequence hypothesis and select the MIB interpretation corresponding to the PBCH DMRS sequence for which PBCH CRC passes.

In some embodiments, the locations of the PBCH DM-RS in the time-frequency resource grid can be different for the different interpretations of the MIB bits. Based on the cell ID, $$N_{ID}^{cell},$$

(which can be determined from the detected PSS and SSS sequences), the current set of SSB resources for PBCH DM-RS are given in Table 4 below (Table 7.4.3.1-1 in 3GPP TS 38.211). The DM-RS subcarrier offset is given by $$v = N_{ID}^{cell} \bmod 4.$$

For the alternative interpretations of the MIB bits, the DM-RS subcarrier offset can be determined as $$v = \left(N_{ID}^{cell} + a\right) \bmod 4,$$

where $\alpha > 0$ depends on which alternative interpretation of the MIB bits to apply.

TABLE 4

| Channel or signal | OFDM symbol number 1 relative to the start of an SS/PBCH block | Subcarrier number k relative to the start of an SS/PBCH block |
|---|---|---|
| DM-RS for PBCH | 1, 3 | $0 + v, 4 + v, 8 + v, \ldots, 236 + v$ |
|  | 2 | $0 + v, 4 + v, 8 + v, \ldots, 44 + v$ |
|  |  | $192 + v, 196 + v, \ldots, 236 + v$ |

In a variation of these embodiments, licensed and unlicensed bands can be distinguished by the value given to MIB field dmrs-TypeA-Position (see FIG. 6). When this value is signaled as "pos2" or "pos3" (or vice-versa) the band is assumed to be licensed or unlicensed, respectively. This embodiment can also be used with an embodiment, described below, where the signaling only indicates which type of band is assumed.

In some embodiments, the valid GSCNs are selected in such a way that for a given frequency range a particular GSCN only maps to a single frequency band and, thus, to a single interpretation of the MIB bits. In other words, the valid GSCNs for different overlapping frequency bands in the same frequency range can be arranged and/or configured as disjoint sets, one set per frequency band. For example, if the valid GSCNs for an unlicensed band are all even, the valid GSCNs for an overlapping licensed band can be restricted to odd GSCNs. However, this is merely an example of two disjoint sets, and other numbers of sets and/or other arrangements of members in respective disjoint sets are possible.

One example of a UE search procedure in such embodiments is described as follows. If the UE is looking for SSBs in the unlicensed band, it will check (i.e., tune its receiver and attempt SSB detection) the GSCNs defined for the unlicensed band. If the UE is looking for SSBs in the licensed band, it will check (i.e., tune its receiver and attempt SSB detection) all GSCNs except the ones in the unlicensed band. So, if the two sets of GSCNs are disjoint, the UE will know if it is a licensed band or unlicensed band from the detected GSCN, and thus can interpret the MIB bits accordingly.

Alternatively, if the UE finds an SSB at a particular ARFCN (i.e., the UE knows to which frequency the receiver is tuned), it can map that ARFCN to a GSCN using known relationship(s) between the two parameters. The UE can then map the GSCN to a frequency band using a table and determine if the GSCN corresponds to a licensed band or an unlicensed band.

In some embodiments, the secondary synchronization sequences (SSS) in the SSBs are selected in such a way that for a given frequency range an SSS sequence only maps to a single frequency band. That is, the valid SSS sequences for different bands should be chosen as disjoint sets, each of which is associated with one of the overlapping frequency bands. In such embodiments, the UE can determine the frequency based on detecting SSS, in a similar manner as described above in relation to disjoint sets of GSCN.

In related embodiments, the primary synchronization sequences (PSS) for SSB can be partitioned into disjoint sets, each associated with a different overlapping frequency band, in a similar manner. In other related embodiments, disjoint sets of PSS/SSS sequence pairs can be arranged and/or configured, each associated with a different overlapping frequency band. In these embodiments, the UE can determine the frequency band based on detecting PSS or PSS and SSS.

In some embodiments, a combination of the cellBarred and intraFreqReselection MIB fields (see FIG. 6) are used to distinguish between overlapping frequency bands (e.g., licensed and unlicensed). As current specified, if a cell is indicated as "barred," the intraFreqReselection MIB field indicates whether another cell on the same carrier frequency can be accessed within 300 seconds. In these embodiments, when the cell status is not indicated as "barred" or the cell is not treated as being barred based on SIB1 field cellReservedForOtherUse being set to "true", the intraFreqReselection MIB field can indicate whether the band is licensed or unlicensed. For example, the intraFreqReselection field can indicate that cell reselection on the same frequency is "allowed" for unlicensed bands and as "not allowed" for licensed bands. However, when a cell is indicated as being barred, the UE simply follows the conventional procedure for cell reselection as currently specified. Since, the UE ultimately gains access to the system via a cell that is not indicated as being barred, the above procedure can distinguish between licensed and unlicensed spectrum without any adverse impacts to current operation.

In some embodiments, the UE can be configured to search for the system information first assuming a licensed (unlicensed) band and, if the search fails, then assuming an unlicensed (licensed) band. Such embodiments can reduce search complexity for the UE while still leaving the option of operating with any particular configuration in any type of band.

The embodiments described above can be further illustrated with reference to FIGS. 10-11, which depict exemplary methods (e.g., procedures) performed by UEs and network nodes, respectively. Put differently, various features of the operations described below correspond to various embodiments described above. The exemplary methods shown in FIGS. 10-11 can be used cooperatively to provide various benefits, advantages, and/or solutions to problems, including those described herein. Although FIGS. 10-11 show specific blocks in particular orders, the operations corresponding to the blocks can be performed in different orders than shown and can be combined and/or divided into blocks having different functionality than shown. Optional blocks or operations are indicated by dashed lines.

In particular, FIG. 10 (which includes FIGS. 10A-10B) shows a flow diagram of an exemplary method (e.g., procedure) for receiving system information (SI) associated with a cell in a wireless network, according to various exemplary embodiments of the present disclosure. The exemplary method can be performed by a user equipment (UE, e.g., wireless device, IoT device, modem, etc. or component thereof) such as UEs configured as described herein with reference to other figures.

The exemplary method can include the operations of block 1020, where the UE can receive, from the wireless network, a master information block (MIB) including SI associated with the cell. The MIB can be applicable to both a first frequency band and a second frequency band that have a common frequency range. In some embodiments, the first frequency band can be a licensed-access band, and the second frequency band can be a shared-spectrum channel access or unlicensed-access band. Such an arrangement is illustrated in FIGS. 7A-7B.

The exemplary method can also include the operations of block 1030, where the UE can determine whether the MIB applies to the first frequency band or the second frequency band. This can be done according to various embodiments, described in more detail below.

In some embodiments, the MIB includes a first SI field and a second SI field. In such embodiments, the exemplary method can also include the operations of block 1040, where the UE can, based on determining that the MIB applies to the second frequency band, interpret the first and second SI fields as a parameter indicating a quasi-co-location (QCL) relationship between synchronization signal/physical broadcast channel blocks (SSBs) associated with the cell. For example, the first and second SI fields can be the ssbSubcarrierSpacingCommon and SubcarrierOffset fields, respectively, or the ssbSubcarrierSpacing-Common and spare fields, respectively, as discussed above.

In some embodiments, the MIB can include a third SI field related to a physical control channel configuration associated with a system information block (SIB, e.g., SIB1) that includes further SI. In some of these embodiments, the physical control channel configuration can include a first number of consecutive frequency-domain resource blocks and a second number of consecutive time-domain symbols.

In some of these embodiments, the exemplary method can also include the operations of block 1050-1060. In block 1050, the UE can, based on determining that the MIB applies to the first frequency band, interpret the third SI field as indicating a first table from which the physical control channel configuration can be determined. In block 1060, the UE can, based on determining that the MIB applies to the second frequency band, interpret the third SI field as indicating a second table from which the physical control channel configuration can be determined.

Furthermore, in some of these embodiments, the exemplary method can also include the operations of blocks 1070-1080. In block 1070, the UE can determine the physical control channel configuration based on the first table or the second table. In this manner, different tables can be used for determining PDCCH configurations for overlapping licensed and unlicensed frequency bands. In block 1080, the UE can receive scheduling information for the SIB, via the physical control channel, based on the determined physical control channel configuration.

In some of these embodiments (i.e., where the MIB includes the third SI field), the determining operations of block 1030 can include the operations of sub-blocks 1031a-c. In sub-block 1031a, the UE can, based on a hypothesis that the MIB applies to one of the first and second frequency bands, attempt to receive the SIB based on a physical control channel configuration corresponding to the one of the first and second frequency bands. In sub-block 1031b, the UE can determine that the MIB applies to the one of the first and second frequency bands when the attempt to receive the SIB is successful (e.g., as indicated by SIB CRC passing). In sub-block 1031c, the UE can determine that the MIB applies to the other of the first and second frequency bands when the attempt to receive the SIB is unsuccessful (e.g., as indicated by SIB CRC failure).

In some embodiments, the exemplary method can also include the operations of block 1010, where the UE can receive, from the wireless network on a first frequency in the common frequency range, an SSB associated with the cell.

In some of these embodiments, the first frequency can be associated with a global synchronization channel number (GSCN). In such embodiments, the determining operations of block 1030 can include the operations of sub-blocks 1032a-b, where the UE can determine that the MIB applies to the first frequency band when the GSCN is one of a first set of values, and determine that the MIB applies to the second frequency band when the GSCN is one of a second set of values. The first set and second set can be non-overlapping and/or disjoint. For example, one of the first and second sets can be even-numbered GSCNs and the other of the first and second sets can be odd-numbered GSCNs.

In other of these embodiments, the SSB can include a primary synchronization signal (PSS) and a secondary synchronization signal (SSS), where the PSS is associated with a PSS code and the SSS is associated with an SSS code. In such embodiments, the determining operations of block 1030 can include the operations of sub-blocks 1033a-c. In sub-block 1033a, the UE can detect a PSS code and/or an SSS code associated with the received SSB. In sub-block 1033b, the UE can determine that the MIB applies to the first frequency band when the detected PSS code and/or the detected SSS code is part of a first set of codes. In sub-block 1033c, the UE can determine that the MIB applies to the second frequency band when the detected PSS code and/or the detected SSS code is part of a second set of codes. In various embodiments, the first and second sets of codes can be non-overlapping sets of one of the following: PSS codes; SSS codes; or combinations of PSS codes and SSS codes.

In some embodiments, the MIB can be received (e.g., in block 1020) in a physical broadcast channel (PBCH) payload, together with a PBCH cyclic redundancy check (CRC) field associated with the PBCH payload. In some of these embodiments, the determining operations of block 1030 can include the operations of sub-blocks 1034a-b, where the UE can determine that the MIB applies to the first frequency band when bits of the PBCH CRC field are ordered according to a first ordering, and determine that the MIB applies to the second frequency band when bits of the PBCH CRC field are ordered according to a second ordering. The first ordering can be different from the second ordering.

In other of these embodiments, the determining operations of block 1030 can include the operations of sub-blocks 1035a-b, where the UE can determine that the MIB applies to the first frequency band when the PBCH CRC field and/or the PBCH payload are scrambled according to a first scrambling, and determine that the MIB applies to the second frequency band when the PBCH CRC field and/or the PBCH payload are scrambled according to a second scrambling. The first scrambling can be different from the second scrambling.

In some embodiments, the PBCH can be associated with a demodulation reference signal (DMRS) sequence, with each DMRS in the DMRS sequence being assigned to a particular location in a time-frequency grid (e.g., as shown in FIG. 4). In such embodiments, the determining operations of block 1030 can include the operations of sub-blocks 1036a-b. In sub-block 1036a, the UE can determine that the MIB applies to the first frequency band when the DMRS in the DMRS sequence are ordered according to a first ordering and/or are assigned to a first set of locations in the time-frequency grid. Similarly, in sub-block 1036b, the UE can determine that the MIB applies to the second frequency band when the DMRS in the DMRS sequence are ordered according to a second ordering that is different than the first ordering, and/or are assigned to a second set of locations in the time-frequency grid, different from the first set.

In some embodiments, the MIB can include fourth, fifth, and sixth SI fields related to characteristics other than the frequency band of the cell. In such embodiments, determining whether the MIB applies to the first frequency band or the second frequency band (e.g., in block 1030) can be based on at least one of the fourth, fifth, and sixth SI fields.

In some of these embodiments, the fourth SI field (e.g., dmrs-TypeA-Position) indicates a starting symbol for DMRS. In such embodiments, the determining operations of block 1030 can include the operations of sub-blocks 1037a-b, where the UE can determine that the MIB applies to the first frequency band when the fourth SI field indicates a first starting symbol (e.g., pos2), and determine that the MIB applies to the second frequency band when the fourth SI field indicates a second starting symbol (e.g., pos3), different from the first starting symbol.

In other of these embodiments, the fifth SI field (e.g., cellBarred) indicates whether the cell is barred for access, and the sixth SI field (e.g., intraFreqReselection) indicates whether a further cell, at the first frequency, can be accessed within a time period. In such embodiments, the determining operations of block 1030 can include the operations of sub-blocks 1038a-b, particularly when the fifth SI field indicates the cell is not barred for access. In sub-block 1038a, the UE can determine that the MIB applies to the first frequency band when sixth SI field indicates that the further cell cannot be accessed within the time period. In sub-block 1038b, the UE can determine that the MIB applies to the second frequency band when sixth SI field indicates that the further cell can be accessed within the time period.

In some of these embodiments, determining whether the MIB applies to the first frequency band or the second frequency (e.g., block 1030) can be performed when the fifth SI field (e.g., cellBarred) indicates the cell is not barred for access. In some variants, the UE can receive a SIB (e.g., SIB1) that includes further SI comprising a seventh SI field (e.g., cellReservedForOtherUse) indicating whether the cell is reserved. In these variants, determining whether the MIB applies to the first frequency band or the second frequency (e.g., block 1030) can also be conditioned on the seventh SI field indicating that the cell is reserved.

In addition, FIG. 11 (which includes FIGS. 11A-11B) shows a flow diagram of an exemplary method (e.g., procedure) for transmitting system information (SI) associated with a cell in a wireless network, according to various exemplary embodiments of the present disclosure. The exemplary method can be performed by a network node (e.g., base station, eNB, gNB, ng-eNB, etc., or component thereof) serving a cell in a wireless network (e.g., E-UTRAN, NG-RAN), such as network nodes configured as described herein with reference to other figures.

The exemplary method can include the operations of block 1120, where the network node can transmit a master information block (MIB) including SI associated with the cell. The MIB can be applicable to both a first frequency band and a second frequency band that have a common frequency range. In some embodiments, the first frequency band can be a licensed-access band, and the second frequency band can be a shared-spectrum channel access or unlicensed-access band. Such an arrangement is illustrated in FIGS. 7A-7B.

The exemplary method can also include the operations of block 1130, where the network node can indicate whether the MIB applies to the first frequency band or the second frequency band. This indication can be done according to various embodiments, based on one or more of the following: information associated with a physical broadcast channel (PBCH) carrying the MIB; a synchronization signal associated with the cell; and SI fields, in the MIB, related to characteristics other than the frequency band of the cell.

In some embodiments, the MIB can include a first SI field and a second SI field. In such embodiments, the exemplary method can also include the operations of block 1140, where the network node can, when indicating that the MIB applies to the second frequency band, encode in the first and second SI fields a parameter indicating a quasi-co-location (QCL) relationship between synchronization signal/physical broadcast channel blocks (SSBs) associated with the cell. For example, the first and second SI fields can be the ssbSubcarrierSpacingCommon and SubcarrierOffset fields, respectively, or the ssbSubcarrierSpacing-Common and spare fields, respectively, as discussed above.

In some embodiments, the MIB can include a third SI field related to a physical control channel configuration associated with a system information block (SIB, e.g., SIB1) that includes further SI. In some of these embodiments, the physical control channel configuration can include a first number of consecutive frequency-domain resource blocks and a second number of consecutive time-domain symbols. In some of these embodiments, the exemplary method can also include the operations of block 1150-1160. In block 1150, the network node can, when indicating that the MIB applies to the first frequency band, encode in the third SI field an indicator of a first table from which the physical control channel configuration can be determined. In block 1160, the network node can, when indicating that the MIB applies to the second frequency band, encode in the third SI field an indicator of a second table from which the physical control channel configuration can be determined. Furthermore, in some of these embodiments, the exemplary method can also include the operations of block 1170, where the network node can transmit scheduling information for the SIB, via the physical control channel, based on the physical control channel configuration according to the indicator in the third SI field.

In some embodiments, the exemplary method can also include the operations of block 1110, where the network node can transmit, on a first frequency in the common frequency range, an SSB associated with the cell. In some of these embodiments, the first frequency can be associated with a global synchronization channel number (GSCN). In such embodiments, the indicating operations of block 1130 can include the operations of sub-blocks 1131*a-b*, where the network node can indicate that the MIB applies to the first frequency band when the GSCN is one of a first set of values, and indicate that the MIB applies to the second frequency band when the GSCN is one of a second set of values. The first set and second set can be non-overlapping and/or disjoint. For example, one of the first and second sets can be even-numbered GSCNs and the other of the first and second sets can be odd-numbered GSCNs.

In other of these embodiments, the SSB can include a primary synchronization signal (PSS) and a secondary synchronization signal (SSS), where the PSS is associated with a PSS code and the SSS is associated with an SSS code. In such embodiments, the indicating operations of block 1130 can include the operations of sub-blocks 1132*a-b*, where the network node can select the PSS code and/or the SSS code from a first set of codes when the MIB applies to the first frequency band, and select the PSS code and/or the SSS code from a second set of codes when the MIB applies to the second frequency band. In various embodiments, the first and second sets of codes can be non-overlapping sets of one of the following: PSS codes; SSS codes; or combinations of PSS codes and SSS codes.

In some embodiments, the MIB can be transmitted (e.g., in block 1120) in a physical broadcast channel (PBCH) payload, together with a PBCH cyclic redundancy check (CRC) field associated with the PBCH payload. In some of these embodiments, the indicating operations of block 1130 can include the operations of sub-blocks 1133*a-b*, where the network node can order bits of the PBCH CRC field according to a first ordering when the MIB applies to the first frequency band, and order bits of the PBCH CRC field according to a second ordering when the MIB applies to the second frequency band. The first ordering can be different from the second ordering.

In other of these embodiments, the indicating operations of block 1130 can include the operations of sub-blocks 1134*a-b*, where the network node can scramble at least one of the PBCH CRC field and the PBCH payload according to a first scrambling when the MIB applies to the first frequency band, and scramble at least one of the PBCH CRC field and the PBCH payload according to a second scrambling when the MIB applies to the second frequency band. The first scrambling can be different from the second scrambling.

In some embodiments, the PBCH can be associated with a demodulation reference signal (DMRS) sequence, with each DMRS in the DMRS sequence being assigned to a particular location in a time-frequency grid (e.g., as shown in FIG. 4). In such embodiments, the indicating operations of block 1130 can include the operations of sub-blocks 1135*a-b*. In sub-block 1135*a*, the network node can indicate that the MIB applies to the first frequency band based on ordering the DMRS according to a first ordering and/or assigning the DMRS to a first set of locations in the time-frequency grid. Similarly, in sub-block 1036*b*, the network node can indicate that the MIB applies to the second frequency band based on ordering the DMRS according to a second ordering that is different than the first ordering, and/or assigning the DMRS to a second set of locations in the time-frequency grid, different from the first set.

In some embodiments, the MIB can include fourth, fifth, and sixth SI fields related to characteristics other than the frequency band of the cell. In such embodiments, indicating whether the MIB applies to the first frequency band or the second frequency band (e.g., in block 1130) can be based on at least one of the fourth, fifth, and sixth SI fields.

In some of these embodiments, the fourth SI field (e.g., dmrs-TypeA-Position) indicates a starting symbol for DMRS. In such embodiments, the indicating operations of block 1130 can include the operations of sub-blocks 1136*a-b*, where the network node can indicate, in the fourth SI field, a first starting symbol (e.g., pos2) when the MIB applies to the first frequency band, and indicate, in the fourth SI field, a second starting symbol (e.g., pos3) when the MIB applies to the second frequency band. The second starting symbol is different from the first starting symbol.

In other of these embodiments, the fifth SI field (e.g., cellBarred) indicates whether the cell is barred for access and the sixth SI field (e.g., intraFreqReselection) indicates whether a further cell, at the first frequency, can be accessed within a time period. In such embodiments, the indicating operations of block 1130 can include the operations of sub-blocks 1137*a-b*, particularly when the fifth SI field indicates the cell is not barred for access. In sub-block 1137*a*, the network node can indicate, in sixth SI field, that the further cell cannot be accessed within the time period when the MIB applies to the first frequency band. In sub-block 1137*b*, the network node can indicate, in sixth SI field, that the further cell can be accessed within the time period when the MIB applies to the second frequency band.

In some of these embodiments (i.e., with the fifth and sixth SI fields in MIB), indicating whether the MIB applies to the first frequency band or the second frequency (e.g., block 1130) can be conditioned upon the fifth SI field (e.g., cellBarred) indicating that the cell is not barred for access. In some variants, the network node can also transmit a SIB (e.g., SIB1) that includes further SI comprising a seventh SI field (e.g., cellReservedForOtherUse) indicating whether the cell is reserved. In these variants, indicating whether the MIB applies to the first frequency band or the second frequency (e.g., block 1130) can also be performed when the seventh SI field indicates that the cell is reserved.

Although various embodiments are described herein above in terms of methods, the person of ordinary skill will recognize that such methods can be embodied by various combinations of hardware and software in various systems, communication devices, computing devices, control devices, apparatus, devices, computer-readable media, computer program products, etc.

Figure 12:
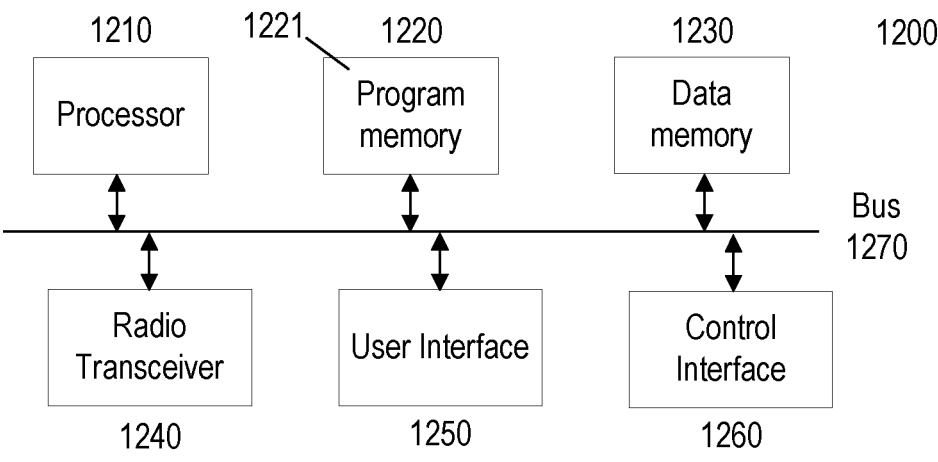
FIG. 12 is a block diagram of an exemplary wireless device or UE, according to various embodiments of the present disclosure.

FIG. 12 shows a block diagram of an exemplary wireless device or user equipment (UE) 1200 (hereinafter referred to as "UE 1200") according to various embodiments of the present disclosure, including those described above with reference to other figures. For example, UE 1200 can be configured by execution of instructions, stored on a computer-readable medium, to perform operations corresponding to one or more of the exemplary methods and/or procedures described above.

UE 1200 can include a processor 1210 (also referred to as "processing circuitry") that can be operably connected to a program memory 1220 and/or a data memory 1230 via a bus 1270 that can comprise parallel address and data buses, serial ports, or other methods and/or structures known to those of ordinary skill in the art. Program memory 1220 can store software code, programs, and/or instructions (collectively shown as computer program product 1261 in FIG. 12) that, when executed by processor 1210, can configure and/or facilitate UE 1200 to perform various operations, including operations corresponding to various exemplary methods described herein. As part of or in addition to such operations, execution of such instructions can configure and/or facilitate UE 1200 to communicate using one or more wired or wireless communication protocols, including one or more wireless communication protocols standardized by 3GPP, 3GPP2, or IEEE, such as those commonly known as 5G/NR, LTE, LIE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1240, user interface 1250, and/or control interface 1260.

As another example, processor 1210 can execute program code stored in program memory 1220 that corresponds to MAC, RLC, PDCP, and RRC layer protocols standardized by 3GPP (e.g., for NR and/or LTE). As a further example, processor 1210 can execute program code stored in program memory 1220 that, together with radio transceiver 1240, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1210 can execute program code stored in program memory 1220 that, together with radio transceiver 1240, implements device-to-device (D2D) communications with other compatible devices and/or UEs.

Program memory 1220 can also include software code executed by processor 1210 to control the functions of UE 1200, including configuring and controlling various components such as radio transceiver 1240, user interface 1250, and/or host interface 1260. Program memory 1220 can also comprise one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1220 can comprise an external storage arrangement (not shown) remote from UE 1200, from which the instructions can be downloaded into program memory 1220 located within or removably coupled to UE 1200, so as to enable execution of such instructions.

Data memory 1230 can include memory area for processor 1210 to store variables used in protocols, configuration, control, and other functions of UE 1200, including operations corresponding to, or comprising, any of the exemplary methods and/or procedures described herein. Moreover, program memory 1220 and/or data memory 1230 can include non-volatile memory (e.g., flash memory), volatile memory (e.g., static or dynamic RAM), or a combination thereof. Furthermore, data memory 1230 can comprise a memory slot by which removable memory cards in one or more formats (e.g., SD Card, Memory Stick, Compact Flash, etc.) can be inserted and removed.

Persons of ordinary skill will recognize that processor 1210 can include multiple individual processors (including, e.g., multi-core processors), each of which implements a portion of the functionality described above. In such cases, multiple individual processors can be commonly connected to program memory 1220 and data memory 1230 or individually connected to multiple individual program memories and or data memories. More generally, persons of ordinary skill in the art will recognize that various protocols and other functions of UE 1200 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1240 can include radio-frequency transmitter and/or receiver functionality that facilitates the UE 1200 to communicate with other equipment supporting like wireless communication standards and/or protocols. In some exemplary embodiments, the radio transceiver 1240 includes one or more transmitters and one or more receivers that enable UE 1200 to communicate according to various protocols and/or methods proposed for standardization by 3GPP and/or other standards bodies. For example, such functionality can operate cooperatively with processor 1210 to implement a PHY layer based on OFDM, OFDMA, and/or SC-FDMA technologies, such as described herein with respect to other figures.

In some exemplary embodiments, radio transceiver 1240 includes one or more transmitters and one or more receivers that can facilitate the UE 1200 to communicate with various LTE, LTE-Advanced (LTE-A), and/or NR networks according to standards promulgated by 3GPP. In some exemplary embodiments of the present disclosure, the radio transceiver 1240 includes circuitry, firmware, etc. necessary for the UE 1200 to communicate with various NR, NR-U, LTE, LTE-A, LTE-LAA, UMTS, and/or GSM/EDGE networks, also according to 3GPP standards. In some embodiments, radio transceiver 1240 can include circuitry supporting D2D communications between UE 1200 and other compatible UEs.

In some embodiments, radio transceiver 1240 includes circuitry, firmware, etc. necessary for the UE 1200 to communicate with various CDMA2000 networks, according to 3GPP2 standards. In some embodiments, the radio transceiver 1240 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1240 can include a transceiver that is capable of wired communication, such as by using IEEE 802.3 Ethernet technology. The functionality particular to each of these embodiments can be coupled with and/or controlled by other circuitry in the UE 1200, such as the processor 1210 executing program code stored in program memory 1220 in conjunction with, and/or supported by, data memory 1230.

User interface 1250 can take various forms depending on the particular embodiment of UE 1200, or can be absent from UE 1200 entirely. In some embodiments, user interface 1250 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1200 can comprise a tablet computing device including a larger touchscreen display. In such embodiments, one or more of the mechanical features of the user interface 1250 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1200 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1200 having a touch screen display are capable of receiving user inputs, such as inputs related to exemplary methods and/or procedures described herein or otherwise known to persons of ordinary skill in the art.

In some embodiments, UE 1200 can include an orientation sensor, which can be used in various ways by features and functions of UE 1200. For example, the UE 1200 can use outputs of the orientation sensor to determine when a user has changed the physical orientation of the UE 1200's touch screen display. An indication signal from the orientation sensor can be available to any application program executing on the UE 1200, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1260 of the UE 1200 can take various forms depending on the particular exemplary embodiment of UE 1200 and of the particular interface requirements of other devices that the UE 1200 is intended to communicate with and/or control. For example, the control interface 1260 can comprise an RS-232 interface, an RS-4125 interface, a USB interface, an HDMI interface, a Bluetooth interface, an IEEE ("Firewire") interface, an I$^2$C interface, a PCMCIA interface, or the like. In some exemplary embodiments of the present disclosure, control interface 1260 can comprise an IEEE 802.3 Ethernet interface such as described above. In some exemplary embodiments of the present disclosure, the control interface 1260 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 1200 can comprise more functionality than is shown in FIG. 12 including, for example, a video and/or still-image camera, microphone, media player and/or recorder, etc. Moreover, radio transceiver 1240 can include circuitry necessary to communicate using additional radio-frequency communication standards including Bluetooth, GPS, and/or others. Moreover, the processor 1210 can execute software code stored in the program memory 1220 to control such additional functionality. For example, directional velocity and/or position estimates output from a GPS receiver can be available to any application program executing on the UE 1200, including various exemplary methods and/or computer-readable media according to various exemplary embodiments of the present disclosure.

Figure 13:
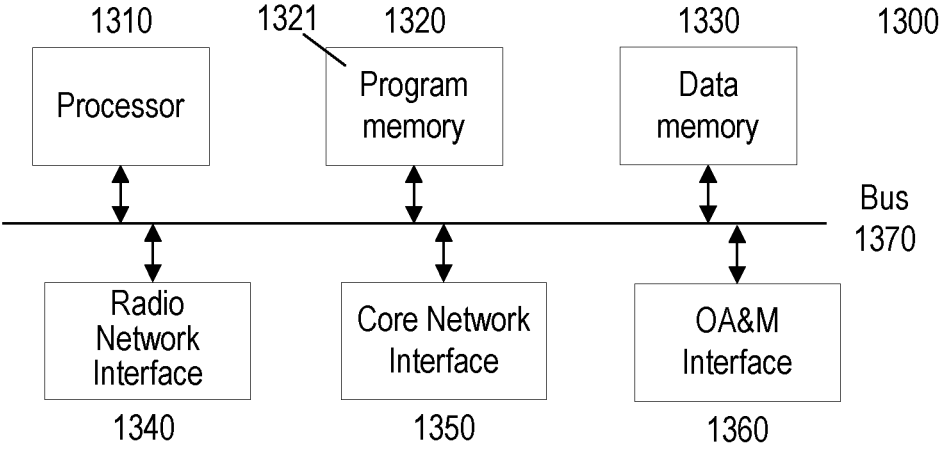
FIG. 13 is a block diagram of an exemplary network node, according to various embodiments of the present disclosure.

FIG. 13 shows a block diagram of an exemplary network node 1300 according to various embodiments of the present disclosure, including those described above with reference to other figures. For example, exemplary network node 1300 can be configured by execution of instructions, stored on a computer-readable medium, to perform operations corresponding to one or more of the exemplary methods and/or procedures described above. In some exemplary embodiments, network node 1300 can comprise a base station, eNB, gNB, or one or more components thereof. For example, network node 1300 can be configured as a central unit (CU) and one or more distributed units (DUs) according to NR gNB architectures specified by 3GPP. More generally, the functionally of network node 1300 can be distributed across various physical devices and/or functional units, modules, etc.

Network node 1300 can include processor 1310 (also referred to as "processing circuitry") that is operably connected to program memory 1320 and data memory 1330 via bus 1370, which can include parallel address and data buses, serial ports, or other methods and/or structures known to those of ordinary skill in the art.

Program memory 1320 can store software code, programs, and/or instructions (collectively shown as computer program product 1321 in FIG. 13) that, when executed by processor 1310, can configure and/or facilitate network node 1300 to perform various operations, including operations corresponding to various exemplary methods described herein. As part of and/or in addition to such operations, program memory 1320 can also include software code executed by processor 1310 that can configure and/or facilitate network node 1300 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 1340 and/or core network interface 1350. By way of example, core network interface 1350 can comprise the S1 or NG interface and radio network interface 1340 can comprise the Uu interface, as standardized by 3GPP. Program memory 1320 can also comprise software code executed by processor 1310 to control the functions of network node 1300, including configuring and controlling various components such as radio network interface 1340 and core network interface 1350.

Data memory 1330 can comprise memory area for processor 1310 to store variables used in protocols, configuration, control, and other functions of network node 1300. As such, program memory 1320 and data memory 1330 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1310 can include multiple individual processors (not shown), each of which implements a portion of the functionality described above. In such case, multiple individual processors may be commonly connected to program memory 1320 and data memory 1330 or individually connected to multiple individual program memories and/or data memories. More generally, persons of ordinary skill will recognize that various protocols and other functions of network node 1300 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1340 can comprise transmitters, receivers, signal processors, ASICs, antennas, beamforming units, and other circuitry that enables network node 1300 to communicate with other equipment such as, in some embodiments, a plurality of compatible user equipment (UE). In some embodiments, interface 1340 can also enable network node 1300 to communicate with compatible satellites of a satellite communication network. In some exemplary embodiments, radio network interface 1340 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1340. According to further exemplary embodiments of the present disclosure, the radio network interface 1340 can comprise a PHY layer based on OFDM, OFDMA, and/or SC-FDMA technologies. In some embodiments, the functionality of such a PHY layer can be provided cooperatively by radio network interface 1340 and processor 1310 (including program code in memory 1320).

Core network interface 1350 can comprise transmitters, receivers, and other circuitry that enables network node 1300 to communicate with other equipment in a core network such as, in some embodiments, circuit-switched (CS) and/or packet-switched Core (PS) networks. In some embodiments, core network interface 1350 can comprise the S1 interface standardized by 3GPP. In some embodiments, core network interface 1350 can comprise the NG interface standardized by 3GPP. In some exemplary embodiments, core network interface 1350 can comprise one or more interfaces to one or more AMFs, SMFs, SGWs, MIMEs, SGSNs, GGSNs, and other physical devices that comprise functionality found in GERAN, UTRAN, EPC, SGC, and CDMA2000 core networks that are known to persons of ordinary skill in the art. In some embodiments, these one or more interfaces may be multiplexed together on a single physical interface. In some embodiments, lower layers of core network interface 1350 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1300 can include hardware and/or software that configures and/or facilitates network node 1300 to communicate with other network nodes in a RAN, such as with other eNBs, gNBs, ng-eNBs, en-gNBs, IAB nodes, etc. Such hardware and/or software can be part of radio network interface 1340 and/or core network interface 1350, or can be a separate functional unit (not shown). For example, such hardware and/or software can configure and/or facilitate network node 1300 to communicate with other RAN nodes via the X2 or Xn interfaces, as standardized by 3GPP.

OA&M interface 1360 can comprise transmitters, receivers, and other circuitry that enables network node 1300 to communicate with external networks, computers, databases, and the like for purposes of operations, administration, and maintenance of network node 1300 or other network equipment operably connected thereto. Lower layers of OA&M interface 1360 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1340, core network interface 1350, and OA&M interface 1360 may be multiplexed together on a single physical interface, such as the examples listed above.

Figure 14:
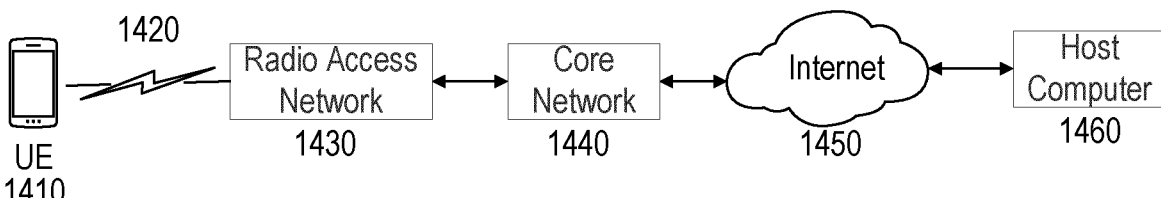
FIG. 14 is a block diagram of an exemplary network configured to provide over-the-top (OTT) data services between a host computer and a UE, according to various embodiments of the present disclosure.

FIG. 14 is a block diagram of an exemplary communication network configured to provide over-the-top (OTT) data services between a host computer and a user equipment (UE), according to one or more exemplary embodiments of the present disclosure. UE 1410 can communicate with radio access network (RAN) 1430 over radio interface 1420, which can be based on protocols described above including, e.g., LTE, LTE-A, and 5G/NR. For example, UE 1410 can be configured and/or arranged as shown in other figures discussed above.

RAN 1430 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1430 can cooperatively operate using licensed and unlicensed spectrum. In some embodiments, RAN 1430 can include, or be capable of communication with, one or more satellites comprising a satellite access network. RAN 1430 can further communicate with core network 1440 according to various protocols and interfaces described above. For example, one or more apparatus (e.g., base stations, eNBs, gNBs, etc.) comprising RAN 1430 can communicate to core network 1440 via core network interface 1650 described above. In some exemplary embodiments, RAN 1430 and core network 1440 can be configured and/or arranged as shown in other figures discussed above. For example, eNBs comprising an E-UTRAN 1430 can communicate with an EPC core network 1440 via an S1 interface, such as shown in FIG. 1. As another example, gNBs comprising a NR RAN 1430 can communicate with a 5GC core network 1430 via an NG interface.

Core network 1440 can further communicate with an external packet data network, illustrated in FIG. 14 as Internet 1450, according to various protocols and interfaces known to persons of ordinary skill in the art. Many other devices and/or networks can also connect to and communicate via Internet 1450, such as exemplary host computer 1460. In some exemplary embodiments, host computer 1460 can communicate with UE 1410 using Internet 1450, core network 1440, and RAN 1430 as intermediaries. Host computer 1460 can be a server (e.g., an application server) under ownership and/or control of a service provider. Host computer 1460 can be operated by the OTT service provider or by another entity on the service provider's behalf.

For example, host computer 1460 can provide an over-the-top (OTT) packet data service to UE 1410 using facilities of core network 1440 and RAN 1430, which can be unaware of the routing of an outgoing/incoming communication to/from host computer 1460. Similarly, host computer 1460 can be unaware of routing of a transmission from the host computer to the UE, e.g., the routing of the transmission through RAN 1430. Various OTT services can be provided using the exemplary configuration shown in FIG. 14 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 14 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide efficient techniques for indicating (e.g., by a network node) or determining (e.g., by a UE) which of a plurality of interpretations should be applied to a received MIB, wherein the plurality of the interpretations correspond to a plurality of frequency bands that overlap in a frequency range. These embodiments can facilitate correct UE operation in scenarios in which the overlapping frequency bands have different characteristics as expressed in the MIB, such as the overlapping licensed European band and unlicensed U.S. band in the 6.425-7.125 GHz range discussed above. When used in NR and/or LTE UEs (e.g., UE 1410) and eNBs and/or gNBs (e.g., comprising RAN 1430), exemplary embodiments described herein can facilitate UE operation in various frequency bands, which can result in greater network capacity for, and increased use of, OTT data services such as illustrated in FIG. 14.

In addition, FIG. 15 is a flowchart illustrating an exemplary method and/or procedure implemented in a communication system, in accordance with one embodiment. The communication system includes a host computer, a base station and a UE which, in some exemplary embodiments, can be those described with reference to other figures herein. For simplicity of the present disclosure, only drawing references to FIG. 15 will be included in this section. In step 1510, the host computer provides user data. In substep 1511 (which can be optional) of step 1510, the host computer provides the user data by executing a host application. In step 1520, the host computer initiates a transmission carrying the user data to the UE. In step 1530 (which can be optional), the base station transmits to the UE the user data which was carried in the transmission that the host computer initiated, in accordance with the teachings of the embodiments described throughout this disclosure. In step 1540 (which can also be optional), the UE executes a client application associated with the host application executed by the host computer.

FIG. 16 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 16 will be included in this section. In step 1610 of the method, the host computer provides user data. In an optional sub step (not shown) the host computer provides the user data by executing a host application. In step 1620, the host computer initiates a transmission carrying the user data to the UE. The transmission can pass via the base station, in accordance with the teachings of the embodiments described throughout this disclosure. In step 1630 (which can be optional), the UE receives the user data carried in the transmission.

FIG. 17 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 17 will be included in this section. In step 1710 (which can be optional), the UE receives input data provided by the host computer. Additionally or alternatively, in step 1720, the UE provides user data. In substep 1721 (which can be optional) of step 1720, the UE provides the user data by executing a client application. In substep 1711 (which can be optional) of step 1710, the UE executes a client application which provides the user data in reaction to the received input data provided by the host computer. In providing the user data, the executed client application can further consider user input received from the user. Regardless of the specific manner in which the user data was provided, the UE initiates, in substep 1730 (which can be optional), transmission of the user data to the host computer. In step 1740 of the method, the host computer receives the user data transmitted from the UE, in accordance with the teachings of the embodiments described throughout this disclosure.

FIG. 18 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 18 will be included in this section. In step 1810 (which can be optional), in accordance with the teachings of the embodiments described throughout this disclosure, the base station receives user data from the UE. In step 1820 (which can be optional), the base station initiates transmission of the received user data to the host computer. In step 1830 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated examples:

E1. A method, performed by a user equipment (UE), for receiving system information (SI) associated with a cell in a wireless network, the method comprising:

receiving, from the wireless network, a master information block (MIB) including SI associated with the cell, wherein the MIB can be applicable to both a first frequency band and a second frequency band that have a common frequency range; and determining whether the MIB applies to the first frequency band or the second frequency band.

E2. The method of embodiment E1, wherein the first frequency band is a licensed-access band, and the second frequency band is a shared-access or unlicensed-access band.

E3. The method of any of embodiments E1-E2, wherein:
   the MIB includes a first SI field and a second SI field; and
   the method further comprises, based on determining that the MIB applies to the second frequency band, interpreting the first and second SI fields as a parameter indicating a quasi-co-location (QCL) relation for a synchronization signal associated with the cell.

E4. The method of any of embodiments E1-E3, wherein:
   the MIB includes a third SI field related to a physical control channel configuration associated with a system information block (SIB) that includes further SI; and
   the method further comprises:
      based on determining that the MIB applies to the first frequency band, interpreting the third SI field as indicating a first table from which the physical control channel configuration can be determined; and
      based on determining that the MIB applies to the second frequency band, interpreting the third SI field as indicating a second table from which the physical control channel configuration can be determined.

E5. The method of embodiment E4, further comprising:
   determining the physical control channel configuration based on the first table or the second table; and
   receiving scheduling information for the SIB, via the physical control channel, based on the determined physical control channel configuration.

E6. The method of any of embodiments E1-E3, wherein:
   the MIB includes a third SI field related to a physical control channel configuration associated with a system information block (SIB) that includes further SI; and
   determining whether the MIB applies to the first frequency band or the second frequency band comprises:
      based on a hypothesis that the MIB applies to one of the first and second frequency bands, attempting to receive the SIB based on a physical control channel configuration corresponding to the one of the first and second frequency bands;
      determining that the MIB applies to the one of the first and second frequency bands when the attempt to receive the SIB is successful; and
      determining that the MIB applies to the other of the first and second frequency bands when the attempt to receive the SIB is unsuccessful.

E7. The method of any of embodiments E4-E6, wherein the physical control channel configuration includes a first number of consecutive frequency-domain resource blocks and a second number of consecutive time-domain symbols.

E8. The method of any of embodiments E1-E5, further comprising receiving, from the wireless network on a first frequency in the frequency range, a synchronization signal associated with the cell.

E9. The method of embodiment E8, wherein:
   the first frequency is associated with a global synchronization raster channel (GSCN); and
   determining whether the MIB applies to the first frequency band or the second frequency band comprises:
      determining that the MIB applies to the first frequency band when the GSCN is one of a first set of values; and
      determining that the MIB applies to the second frequency band when the GSCN is one of a second set of values,
      wherein the first set and second set are non-overlapping.

E10. The method of embodiment E9, wherein the first set is even-numbered and the second set is odd-numbered.

E11. The method of embodiment E8, wherein:
   the synchronization signal comprises a primary synchronization signal (PSS) and a secondary synchronization signal (SSS);
   the PSS is associated with a PSS code and the SSS is associated with an SSS code;
   determining whether the MIB applies to the first frequency band or the second frequency band comprises:
      detecting a PSS code and/or an SSS code associated with the received synchronization signal;
      determining that the MIB applies to the first frequency band when the detected PSS code and/or the detected SSS code is part of a first set of codes; and
      determining that the MIB applies to the second frequency band when the detected PSS code and/or the detected SSS code is part of a second set of codes.

E12. The method of embodiment E11, wherein the first and second sets of codes are non-overlapping sets of one of the following:
   PSS codes;
   SSS codes; or
   combinations of PSS codes and SSS codes.

E13. The method of any of embodiments E1-E5, wherein the MIB is received in a physical broadcast channel (PBCH) payload, together with a PBCH cyclic redundancy check (CRC) field associated with the PBCH payload.

E14. The method of embodiment E13, wherein determining whether the MIB applies to the first frequency band or the second frequency band comprises:
   determining that the MIB applies to the first frequency band when bits of the PBCH CRC field are ordered according to a first ordering; and
   determining that the MIB applies to the second frequency band when bits of the PBCH CRC field are ordered according to a second ordering,
   wherein the first ordering is different from the second ordering.

E15. The method of embodiment E13, wherein determining whether the MIB applies to the first frequency band or the second frequency band comprises:
   determining that the MIB applies to the first frequency band when at least one of the PBCH CRC field and the PBCH payload is scrambled according to a first scrambling; and
   determining that the MIB applies to the second frequency band when at least one of the PBCH CRC field and the PBCH payload is scrambled according to a second scrambling,
   wherein the first scrambling is different from the second scrambling.

E16. The method of any of embodiments E13-E15, wherein:
   the PBCH is associated with a demodulation reference signal (DMRS) sequence;
   each DMRS in the DMRS sequence is assigned to a particular location in a time-frequency grid; and
   determining whether the MIB applies to the first frequency band or the second frequency band comprises:
      determining that the MIB applies to the first frequency band when the DMRS in the DMRS sequence meet at least one of the following conditions:
         are ordered according to a first ordering, and
         are assigned to a first set of locations in the time-frequency grid; and
      determining that the MIB applies to the second frequency band when the DMRS in the DMRS sequence meet at least one of the following conditions:

are ordered according to a second ordering that is different than the first ordering, and are assigned to a second set of locations in the time-frequency grid, different from the first set.

E17. The method of any of embodiments E1-E5, wherein:

the MIB includes fourth, fifth, and sixth SI fields related to characteristics other than the frequency band of the cell; and determining whether the MIB applies to the first frequency band or the second frequency band is based on at least one of the fourth, fifth, and sixth SI fields.

E18. The method of embodiment E17, wherein:

the fourth SI field indicates a starting symbol for demodulation reference signals (DMRS);

determining whether the MIB applies to the first frequency band or the second frequency band comprises:

determining that the MIB applies to the first frequency band when the fourth SI field indicates a first starting symbol; and determining that the MIB applies to the second frequency band when the fourth SI field indicates a second starting symbol, different from the first starting symbol.

E19. The method of embodiment E17, wherein:

the fifth SI field indicates whether the cell is barred for access;

the sixth SI field indicates whether a further cell, at the first frequency, can be accessed within a time period;

determining whether the MIB applies to the first frequency band or the second frequency comprises, when the fifth SI field indicates the cell is not barred for access:

determining that the MIB applies to the first frequency band when sixth SI field indicates that the further cell cannot be accessed within the time period; and determining that the MIB applies to the second frequency band when sixth SI field indicates that the further cell can be accessed within the time period.

E20. The method of embodiment E19, wherein:

the method further comprises receiving a system information block (SIB) that includes further SI, the further SI including a seventh SI field indicating whether the cell is reserved; and determining whether the MIB applies to the first frequency band or the second frequency is performed when the fifth SI field indicates the cell is not barred for access or the seventh SI field indicates that the cell is reserved.

E21. A method, performed by a network node in a wireless network, for transmitting system information (SI) associated with a cell in the wireless network, the method comprising:

transmitting a master information block (MIB) including SI associated with the cell, wherein the MIB can be applicable to both a first frequency band and a second frequency band that have a common frequency range; and indicating whether the MIB applies to the first frequency band or the second frequency band based on one or more of the following:

information associated with a physical broadcast channel (PBCH) carrying the MIB;

a synchronization signal associated with the cell; and

SI fields, in the MIB, related to characteristics other than the frequency band of the cell.

E22. The method of embodiment E21, wherein the first frequency band is a licensed-access band, and the second frequency band is a shared-access or unlicensed-access band.

E23. The method of any of embodiments E21-E22, wherein:

the MIB includes a first SI field and a second SI field; and the method further comprises, when indicating that the MIB applies to the second frequency band, encoding, in the first and second SI fields, a parameter indicating a quasi-co-location (QCL) relation for a synchronization signal associated with the cell.

E24. The method of any of embodiments E21-E23, wherein:

the MIB includes a third SI field related to a physical control channel configuration associated with a system information block (SIB) that includes further SI; and the method further comprises:

when indicating that the MIB applies to the first frequency band, encoding, in the third SI field, an indicator of a first table from which the physical control channel configuration can be determined; and when indicating that the MIB applies to the second frequency band, encoding, in the third SI field, an indicator of a second table from which the physical control channel configuration can be determined.

E25. The method of embodiment E24, further comprising transmitting scheduling information for the SIB, via the physical control channel, based on the physical control channel configuration according to the indicator in the third SI field.

E26. The method of any of embodiments E24-E25, wherein the physical control channel configuration includes a first number of consecutive frequency-domain resource blocks and a second number of consecutive time-domain symbols.

E27. The method of any of embodiments E21-E25, further comprising transmitting, on a first frequency in the frequency range, a synchronization signal associated with the cell.

E28. The method of embodiment E27, wherein:

the first frequency is associated with a Global Synchronization Channel Number (GSCN); and indicating whether the MIB applies to the first frequency band or the second frequency band comprises:

indicating that the MIB applies to the first frequency band when the GSCN is one of a first set of values; and indicating that the MIB applies to the second frequency band when the GSCN is one of a second set of values, wherein the first set and second set are non-overlapping.

E29. The method of embodiment E28, wherein the first set is even-numbered and the second set is odd-numbered.

E30. The method of embodiment E27, wherein:

the transmitted synchronization signal comprises a primary synchronization signal (PSS) and a secondary synchronization signal (SSS);

the PSS is associated with a PSS code and the SSS is associated with an SSS code;

indicating whether the MIB applies to the first frequency band or the second frequency band comprises:

selecting the PSS code and/or the SSS code from a first set of codes when the MIB applies to the first frequency band; and selecting the PSS code and/or the SSS code from a second set of codes when the MIB applies to the second frequency band.

E31. The method of embodiment E30, wherein the first and second sets of codes are non-overlapping sets of one of the following:
PSS codes;
SSS codes; or
combinations of PSS codes and SSS codes.
E32. The method of any of embodiments E21-E25, wherein the MIB is transmitted in a physical broadcast channel (PBCH) payload, together with a PBCH cyclic redundancy check (CRC) field associated with the PBCH payload.
E33. The method of embodiment E32, wherein indicating whether the MIB applies to the first frequency band or the second frequency band comprises:
ordering bits of the PBCH CRC field according to a first ordering when the MIB applies to the first frequency band; and
ordering bits of the PBCH CRC field according to a second ordering when the MIB applies to the second frequency band,
wherein the first ordering is different from the second ordering.
E34. The method of embodiment E32, wherein indicating whether the MIB applies to the first frequency band or the second frequency band comprises:
scrambling at least one of the PBCH CRC field and the PBCH payload according to a first scrambling when the MIB applies to the first frequency band; and
scrambling at least one of the PBCH CRC field and the PBCH payload according to a second scrambling when the MIB applies to the second frequency band,
wherein the first scrambling is different from the second scrambling.
E35. The method of any of embodiments E32-E34, wherein:
the PBCH, including the MIB, is transmitted in association with a demodulation reference signal (DMRS) sequence;
each DMRS in the DMRS sequence is assigned to a particular location in a time-frequency grid; and
indicating whether the MIB applies to the first frequency band or the second frequency band comprises:
indicating that the MIB applies to the first frequency band based on at least one of the following:
ordering the DMRS according to a first ordering, and
assigning the DMRS to a first set of locations in the time-frequency grid; and
indicating that the MIB applies to the second frequency band based on at least one of the following:
ordering the DMRS according to a second ordering that is different than the first ordering, and
assigning the DMRS to a second set of locations in the time-frequency grid, different from the first set.
E36. The method of any of embodiments E30-E34, wherein:
the MIB includes fourth, fifth, and sixth SI fields related to characteristics other than the frequency band of the cell; and
indicating whether the MIB applies to the first frequency band or the second frequency band is based on at least one of the fourth, fifth, and sixth SI fields.
E37. The method of embodiment E36, wherein:
the fourth SI field indicates a starting symbol for demodulation reference signals (DMRS);
indicating whether the MIB applies to the first frequency band or the second frequency band comprises:
indicating, in the fourth SI field, a first starting symbol when the MIB applies to the first frequency band; and indicating, in the fourth SI field, a second starting symbol when the MIB applies to the second frequency band,
wherein the second starting symbol is different from the first starting symbol.
E38. The method of embodiment E36, wherein:
the fifth SI field indicates whether the cell is barred for access;
the sixth SI field indicates whether a further cell, at the first frequency, can be accessed within a time period;
indicating whether the MIB applies to the first frequency band or the second frequency comprises, when the fifth SI field indicates the cell is not barred for access:
indicating, in sixth SI field, that the further cell cannot be accessed within the time period when the MIB applies to the first frequency band; and
indicating, in sixth SI field, that the further cell can be accessed within the time period when the MIB applies to the second frequency band.
E39. The method of embodiment E38, wherein:
the method further comprises transmitting a system information block (SIB) that includes further SI, the further SI including a seventh SI field indicating whether the cell is reserved; and
indicating whether the MIB applies to the first frequency band or the second frequency is conditioned upon one or more of the following:
indicating, in the fifth SI field, that the cell is not barred for access, and
indicating, in the seventh SI field, that the cell is reserved.
E40. A user equipment, UE (120, 1300, 1510) configured for communication with a network node (105, 110, 115, 1200, 1250, 1400) in a wireless network (100, 1299, 1530), the UE comprising:
radio transceiver circuitry (1340) configured to communicate with the network node; and
processing circuitry (1310) operatively coupled to the radio transceiver circuitry, whereby the processing circuitry and the radio transceiver circuitry are configured to perform operations corresponding to any of the methods of embodiments 1-20.
E41. A user equipment, UE (120, 1300, 1510) configured for communication with a network node (105, 110, 115, 1200, 1250, 1400) in a wireless network (100, 1299, 1530), the UE being further arranged to perform operations corresponding to any of the methods of embodiments E1-E20.
E42. A non-transitory, computer-readable medium (1320) storing computer-executable instructions that, when executed by processing circuitry (1310) of a user equipment, UE (120, 1300, 1510) that is configured for communication with a network node (105, 110, 115, 1200, 1250, 1400) in a wireless network (100, 1299, 1530), configure the UE to perform operations corresponding to any of the methods of embodiments E1-E20.
E43. A computer program product (1321) comprising computer-executable instructions that, when executed by processing circuitry (1310) of a user equipment, UE (120, 1300, 1510) that is configured for communication with a network node (105, 110, 115, 1200, 1250, 1400) in a wireless network (100, 1299, 1530), configure the UE to perform operations corresponding to any of the methods of embodiments E1-E20.
E44. A network node (105, 110, 115, 1200, 1250, 1400), in a wireless network (100, 1299, 1530), configured for communication between a UE and the network node, the network node comprising:

radio network interface circuitry (1440) configured to communicate with the UE; and processing circuitry (1410) operatively coupled to the radio network interface circuitry, whereby the processing circuitry and the radio network interface circuitry are configured to perform operations corresponding to any of the methods of embodiments E21-E39.

E45. A network node (105, 110, 115, 1200, 1250, 1400), in a wireless network (100, 1299, 1530), configured for communication between a UE and the network node, the network node being further arranged to perform operations corresponding to any of the methods of embodiments E21-E39.

E46. A non-transitory, computer-readable medium (1420) storing computer-executable instructions that, when executed by processing circuitry (1410) of a network node (105, 110, 115, 1200, 1250, 1400), in a wireless network (100, 1299, 1530) that is configured for communication between a UE and the network node, configure the network node to perform operations corresponding to any of the methods of embodiments E21-E39.

E47. A computer program product (1421) comprising computer-executable instructions that, when executed by processing circuitry (1410) of a network node (105, 110, 115, 1200, 1250, 1400), in a wireless network (100, 1299, 1530), that is configured for communication between a UE and the network node, configure the network node to perform operations corresponding to any of the methods of embodiments E21-E39.

E48. A communication system including a host computer, the host computer comprising:

a. processing circuitry configured to provide user data; and b. a communication interface configured to forward the user data to a cellular network for transmission to a user equipment (UE) through a core network (CN) and a radio access network (RAN);

wherein:

c. the RAN comprises a first node;

d. the first node comprises a communication transceiver and processing circuitry configured to perform operations corresponding to any of the methods of embodiments E21-E39.

E49. The communication system of the previous embodiment, further comprising the UE.

E50. The communication system of any of the previous two embodiments, wherein:

e. the processing circuitry of the host computer is configured to execute a host application, thereby providing the user data; and f. the UE comprises processing circuitry configured to execute a client application associated with the host application.

E51. The communication system of any of the previous two embodiments, wherein the UE comprises processing circuitry configured to perform operations corresponding to any of the methods of embodiments E1-E20.

E52. A method implemented in a communication system including a host computer, a cellular network, and a user equipment (UE), the method comprising:

a. at the host computer, providing user data;

b. at the host computer, initiating a transmission carrying the user data to the UE via a cellular network comprising a radio access network (RAN); and c. operations, performed by a first node of the RAN, corresponding to any of the methods of embodiments E21-E39.

E53. The method of the previous embodiment, wherein the data message comprises the user data, and further comprising transmitting the user data to the UE via the first node.

E54. The method of any of the previous two embodiments, wherein the user data is provided at the host computer by executing a host application, the method further comprising, at the UE, executing a client application associated with the host application.

E55. The method of any of the previous three embodiments, wherein the method further comprises, at the UE, performing operations corresponding to any of the methods of embodiments E1-E20.

E56. A communication system including a host computer comprising a communication interface configured to receive user data originating from a transmission from a user equipment (UE) via a first node in a radio access network (RAN), wherein:

the first node comprises a communication interface and processing circuitry configured to perform operations corresponding to any of the methods of embodiments E21-E39.

E57. The communication system of the previous embodiment, further including the UE.

E58. The communication system of any of the previous two embodiments, wherein:

the processing circuitry of the host computer is configured to execute a host application; and the UE comprises processing circuitry configured to execute a client application associated with the host application, thereby providing the user data to be received by the host computer.

E59. The method of any of the previous two embodiments, wherein the UE comprises processing circuitry configured to perform operations corresponding to any of the methods of embodiments E1-E20.

The invention claimed is:

1. A method performed by a user equipment (UE) for receiving system information (SI) associated with a cell in a wireless network, the method comprising:

receiving, from the wireless network, a master information block (MIB) including SI associated with the cell, wherein the MIB can be applicable to both a first frequency band and a second frequency band that have a common frequency range; and determining whether the MIB applies to the first frequency band or the second frequency band, wherein the MIB further includes a first SI field, a second SI field, and a third SI field and the third SI field is related to a physical control channel configuration associated with a system information block (SIB) that includes further SI, and wherein the MIB further includes a fourth SI field, a fifth SI field, and a sixth SI field related to characteristics other than the frequency band of the cell, the characteristics other than the frequency band of the cell including at least one of: (i) a UE capability constraint for reception of the SIB; (ii) a synchronization signal/physical broadcast channel block (SSB) transmission density; and (iii) a time offset parameter indicating a relative timing relationship between the SIB and the SSB.

2. The method of claim 1, wherein the first frequency band is a licensed-access band, and the second frequency band is a shared-spectrum channel access or unlicensed-access band.

3. The method of claim 1, wherein the method further comprises, based on determining that the MIB applies to the second frequency band, interpreting the first and second SI fields as a parameter indicating a quasi-co-location (QCL) relationship between synchronization signal/physical broadcast channel blocks (SSBs) associated with the cell.

4. The method of claim 1, wherein determining whether the MIB applies to the first frequency band or the second frequency band comprises:

based on a hypothesis that the MIB applies to one of the first and second frequency bands, attempting to receive the SIB based on a physical control channel configuration corresponding to the one of the first and second frequency bands;

determining that the MIB applies to the one of the first and second frequency bands when the attempt to receive the SIB is successful; and determining that the MIB applies to the other of the first and second frequency bands when the attempt to receive the SIB is unsuccessful.

5. The method of claim 1, further comprising receiving, from the wireless network on a first frequency in the common frequency range, a synchronization signal/physical broadcast channel block, SSB, associated with the cell.

6. The method of claim 5, wherein:

the first frequency is associated with a global synchronization channel number (GSCN); and determining whether the MIB applies to the first frequency band or the second frequency band comprises:

determining that the MIB applies to the first frequency band when the GSCN is one of a first set of values; and determining that the MIB applies to the second frequency band when the GSCN is one of a second set of values, wherein the first set and second set are non-overlapping.

7. The method of claim 6, wherein one of the first and second sets is even-numbered and the other of the first and seconds set is odd-numbered.

8. The method of claim 5, wherein:

the SSB comprises a primary synchronization signal (PSS) and a secondary synchronization signal (SSS);

the PSS is associated with a PSS code and the SSS is associated with an SSS code; and determining whether the MIB applies to the first frequency band or the second frequency band comprises:

detecting a PSS code and/or an SSS code associated with the received SSB;

determining that the MIB applies to the first frequency band when the detected PSS code and/or the detected SSS code is part of a first set of codes; and determining that the MIB applies to the second frequency band when the detected PSS code and/or the detected SSS code is part of a second set of codes.

9. The method of claim 8, wherein the first and second sets of codes are non-overlapping sets of one of the following:

PSS codes;

SSS codes; or combinations of PSS codes and SSS codes.

10. The method of claim 1, wherein the MIB is received in a physical broadcast channel (PBCH) payload together with a PBCH cyclic redundancy check (CRC) field associated with the PBCH payload.

11. The method of claim 10, wherein determining whether the MIB applies to the first frequency band or the second frequency band comprises:

determining that the MIB applies to the first frequency band when at least one of the PBCH CRC field and the PBCH payload is scrambled according to a first scrambling; and determining that the MIB applies to the second frequency band when at least one of the PBCH CRC field and the PBCH payload is scrambled according to a second scrambling, wherein the first scrambling is different from the second scrambling.

12. A method, performed by a network node in a wireless network, for transmitting system information (SI) associated with a cell in the wireless network, the method comprising:

transmitting a master information block (MIB) including SI associated with the cell, wherein the MIB can be applicable to both a first frequency band and a second frequency band that have a common frequency range, wherein the MIB further includes a first SI field, a second SI field, and a third SI field and wherein the third SI field is related to a physical control channel configuration associated with a system information block (SIB) that includes further SI, and wherein the MIB further includes a fourth SI field, a fifth SI field, and a sixth SI fields related to characteristics other than the frequency band of the cell; and indicating whether the MIB applies to the first frequency band or the second frequency band based on one or more of the following:

information associated with a physical broadcast channel (PBCH) carrying the MIB;

a synchronization signal associated with the cell; and

SI fields, in the MIB, related to characteristics other than the frequency band of the cell, the characteristics other than the frequency band of the cell including at least one of: (i) a UE capability constraint for reception of the SIB; (ii) a synchronization signal/physical broadcast channel block (SSB) transmission density; and (iii) a time offset parameter indicating a relative timing relationship between the SIB and the SSB.

13. The method of claim 12, wherein the first frequency band is a licensed-access band, and the second frequency band is a shared-spectrum channel access or unlicensed-access band.

14. The method of claim 12, wherein:

the method further comprises, when indicating that the MIB applies to the second frequency band, encoding in the first and second SI fields a parameter indicating a quasi-co-location (QCL) relationship between synchronization signal/physical broadcast channel blocks (SSBs) associated with the cell.

15. The method of claim 12, further comprising transmitting, on a first frequency in the common frequency range, a synchronization signal/physical broadcast channel block (SSB) associated with the cell.

16. The method of claim 15, wherein:

the first frequency is associated with a Global Synchronization Channel Number (GSCN); and indicating whether the MIB applies to the first frequency band or the second frequency band comprises:

indicating that the MIB applies to the first frequency band when the GSCN is one of a first set of values; and indicating that the MIB applies to the second frequency band when the GSCN is one of a second set of values, wherein the first set and second set are non-overlapping.

17. A user equipment (UE) configured to receive system information (SI) associated with a cell of a wireless network, the UE comprising:

radio transceiver circuitry configured to communicate with a network node via the cell; and processing circuitry operatively coupled to the radio transceiver circuitry, whereby the processing circuitry and the radio transceiver circuitry are configured to:

receive, from the wireless network, a master information block (MIB) including SI associated with the cell, wherein the MIB can be applicable to both a first frequency band and a second frequency band that have a common frequency range; and determine whether the MIB applies to the first frequency band or the second frequency band, wherein the MIB further includes a first SI field, a second SI field, and a third SI field and the third SI field is related to a physical control channel configuration associated with a system information block (SIB) that includes further SI, and wherein the MIB further includes a fourth SI field, a fifth SI field, and a sixth SI field related to characteristics other than the frequency band of the cell, the characteristics other than the frequency band of the cell including at least one of: (i) a UE capability constraint for reception of the SIB; (ii) a synchronization signal/physical broadcast channel block (SSB) transmission density; and (iii) a time offset parameter indicating a relative timing relationship between the SIB and the SSB.

18. The UE of claim 17, wherein:

the first frequency band is a licensed-access band;

the second frequency band is a shared-spectrum channel access or unlicensed-access band; and the processing circuitry and the radio transceiver circuitry are further configured to, based on determining that the MIB applies to the second frequency band, interpret the first and second SI fields as a parameter indicating a quasi-co-location (QCL) relationship between synchronization signal/physical broadcast channel blocks (SSBs) associated with the cell.

19. A network node configured to transmit system information (SI) associated with a cell of a wireless network, the network node comprising:

radio network interface circuitry configured to communicate with a user equipment (UE); and processing circuitry operatively coupled to the radio network interface circuitry, whereby the processing circuitry and the radio network interface circuitry are configured to:

transmit a master information block (MIB) including SI associated with the cell, wherein the MIB can be applicable to both a first frequency band and a second frequency band that have a common frequency range, wherein the MIB further includes a first SI field, a second SI field, and a third SI field and wherein the third SI field is related to a physical control channel configuration associated with a system information block (SIB) that includes further SI, and wherein the MIB further includes a fourth SI field, a fifth SI field, and a sixth SI field related to characteristics other than the frequency band of the cell; and indicate whether the MIB applies to the first frequency band or the second frequency band based on one or more of the following:

information associated with a physical broadcast channel (PBCH) carrying the MIB;

a synchronization signal associated with the cell; and

SI fields, in the MIB, related to characteristics other than the frequency band of the cell, the characteristics other than the frequency band of the cell including at least one of: (i) a UE capability constraint for reception of the SIB; (ii) a synchronization signal/physical broadcast channel block (SSB) transmission density; and (iii) a time offset parameter indicating a relative timing relationship between the SIB and the SSB.

20. The network node of claim 19, wherein:

the first frequency band is a licensed-access band;

the second frequency band is a shared-spectrum channel access or unlicensed-access band; and the processing circuitry and the radio network interface circuitry are further configured to, when indicating that the MIB applies to the second frequency band, encode in the first and second SI fields a parameter indicating a quasi-co-location (QCL) relationship between synchronization signal/physical broadcast channel blocks (SSBs) associated with the cell.

* * * * *